United States Patent
Bodla et al.

(10) Patent No.: US 12,434,832 B2
(45) Date of Patent: Oct. 7, 2025

(54) SYSTEMS AND METHODS FOR LIFTER MOTOR COOLING IN EVTOL AIRCRAFT

(71) Applicant: Archer Aviation Inc., San Jose, CA (US)

(72) Inventors: Karthik Kumar Bodla, Houston, TX (US); Bharat Tulsyan, San Jose, CA (US); Christopher M. Heath, Avon, OH (US); Kerry Manning, Parker, CO (US); Alan D. Tepe, Fremont, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/956,397

(22) Filed: Nov. 22, 2024

(65) Prior Publication Data

US 2025/0083807 A1     Mar. 13, 2025

Related U.S. Application Data

(63) Continuation of application No. 18/163,372, filed on Feb. 2, 2023, now Pat. No. 12,240,599, which is a
(Continued)

(51) Int. Cl.
    *B64C 29/00*     (2006.01)
    *B64D 33/08*     (2006.01)

(52) U.S. Cl.
    CPC .......... *B64C 29/0033* (2013.01); *B64D 33/08* (2013.01)

(58) Field of Classification Search
    CPC .... B64D 33/08; B64D 33/10; B64C 29/0033; B64C 29/0025
    See application file for complete search history.

(56) References Cited

U.S. PATENT DOCUMENTS 2,270,912 A * 1/1942 Theodorsen .......... B64D 33/08
    244/130
3,081,964 A     3/1963 Quenzler
(Continued)

FOREIGN PATENT DOCUMENTS

DE     102018217144 A1    4/2020
EP          3273500 A1    1/2018
(Continued)

OTHER PUBLICATIONS

Kellerman et al., "Design and Optimization of Ram Air-Based Thermal Management Systems for Hybrid-Electric Aircraft." Aerospace, 8, 3, Dec. 23, 2020, 21 pages.
(Continued)

*Primary Examiner* — William L Gmoser
(74) *Attorney, Agent, or Firm* — Finnegan, Henderson, Farabow, Garrett & Dunner, LLP

(57) ABSTRACT

An apparatus for aircraft propulsion includes a propeller and a hybrid-cooled electric engine mounted to a support structure and configured to rotate the propeller. The electric engine is located in an enclosure, with a first heat transfer element thermally coupled to the electric engine via a fluid flow path, partially located outside the enclosure. A second heat transfer element, integral to or thermally coupled to the electric engine, provides air cooling. Both heat transfer elements are housed within the aircraft's support structure. At least one air inlet on the upper side of the support structure receives propeller downwash. A first cooling path directs a portion of the downwash from the air inlet to the first heat transfer element, and a first air outlet exhausts the downwash.

30 Claims, 30 Drawing Sheets

Related U.S. Application Data continuation of application No. 18/055,268, filed on Nov. 14, 2022, now Pat. No. 11,613,350.

(60) Provisional application No. 63/378,680, filed on Oct. 7, 2022.

(56) References Cited

U.S. PATENT DOCUMENTS

| | | |
|---|---|---|
| 3,089,666 A | 5/1963 | Quenzler |
| 3,284,598 A | 11/1966 | George et al. |
| 3,627,234 A | 12/1971 | Dziallas |
| 4,830,312 A | 5/1989 | Hain |
| 4,979,698 A | 12/1990 | Lederman |
| 6,367,738 B1 | 4/2002 | Wadleigh |
| 6,655,631 B2 | 12/2003 | Austen-Brown |
| 7,325,772 B1 | 2/2008 | Hanewinkel, III et al. |
| 8,123,460 B2 | 2/2012 | Collette |
| 8,468,300 B2 | 6/2013 | Kano et al. |
| 8,485,464 B2 | 7/2013 | Kroo |
| 8,707,721 B2 | 4/2014 | Scherer et al. |
| 9,085,355 B2 | 7/2015 | Delorean |
| 9,266,607 B2 | 2/2016 | Fink et al. |
| 9,415,878 B2 | 8/2016 | Wetzel |
| 9,764,833 B1 | 9/2017 | Tighe et al. |
| 9,912,004 B2 | 3/2018 | Turner |
| 10,029,785 B2 | 7/2018 | Niedzballa |
| 10,110,033 B1 | 10/2018 | Hom et al. |
| 10,118,695 B2 | 11/2018 | Thomassin et al. |
| 10,124,890 B2 | 11/2018 | Sada-Salinas et al. |
| 10,138,899 B2 | 11/2018 | Joubert et al. |
| 10,150,560 B2 | 12/2018 | Tighe et al. |
| 10,333,328 B1 | 6/2019 | Hom et al. |
| 10,355,496 B1 | 7/2019 | Furman et al. |
| 10,364,036 B2 | 7/2019 | Tighe et al. |
| 10,538,316 B2 | 1/2020 | Chen |
| 10,669,037 B1 | 6/2020 | Kwon |
| 10,914,789 B2 | 2/2021 | Lemkin et al. |
| 11,258,333 B2 | 2/2022 | Cottrell |
| 2003/0094537 A1 | 5/2003 | Austen-Brown |
| 2009/0084890 A1 | 4/2009 | Reinhardt |
| 2010/0021288 A1 | 1/2010 | Collette |
| 2010/0136390 A1 | 6/2010 | Ueda et al. |
| 2012/0261523 A1 | 10/2012 | Shaw |
| 2013/0020429 A1 | 1/2013 | Kroo |
| 2013/0069594 A1 | 3/2013 | Jung |
| 2013/0092799 A1 | 4/2013 | Tian et al. |
| 2014/0125284 A1 | 5/2014 | Qahouq |
| 2014/0217231 A1 | 8/2014 | Pantalone, III et al. |
| 2015/0175260 A1 | 6/2015 | Hesselbarth |
| 2015/0266571 A1 | 9/2015 | Bevirt et al. |
| 2016/0115864 A1 | 4/2016 | Campbell et al. |
| 2016/0134160 A1 | 5/2016 | Schultz |
| 2016/0200436 A1 | 7/2016 | North et al. |
| 2016/0297520 A1 | 10/2016 | Sada-Salinas et al. |
| 2016/0332724 A1 | 11/2016 | Mehring |
| 2017/0133722 A1 | 5/2017 | Kim et al. |
| 2017/0225779 A1 | 8/2017 | Gamble |
| 2017/0300065 A1 | 10/2017 | Douglas et al. |
| 2017/0349268 A1 | 12/2017 | Duffy et al. |
| 2018/0002023 A1 | 1/2018 | Tian et al. |
| 2018/0043986 A1 | 2/2018 | Miller et al. |
| 2018/0051716 A1 | 2/2018 | Cheung |
| 2018/0251227 A1 | 9/2018 | Ross et al. |
| 2019/0033932 A1* | 1/2019 | Ku .................... B64D 33/08 |
| 2019/0127056 A1 | 5/2019 | Weekes et al. |
| 2019/0135424 A1 | 5/2019 | Baity et al. |
| 2019/0135429 A1 | 5/2019 | Karem |
| 2019/0276158 A1 | 9/2019 | Sinusas et al. |
| 2019/0291862 A1 | 9/2019 | Lyasoff et al. |
| 2019/0329858 A1 | 10/2019 | Bevirt et al. |
| 2019/0329859 A1 | 10/2019 | Bevirt et al. |
| 2021/0387724 A1 | 12/2021 | McLaren et al. |
| 2022/0041275 A1 | 2/2022 | Tian |
| 2022/0194618 A1 | 6/2022 | Jung et al. |
| 2022/0250756 A1 | 8/2022 | Wagner et al. |
| 2022/0267020 A1 | 8/2022 | Warbeck |
| 2022/0285753 A1 | 9/2022 | Rainville |
| 2023/0174247 A1* | 6/2023 | Ahyow .................... B64C 39/08 244/57 |
| 2023/0192310 A1* | 6/2023 | Fukazu .................... B64D 27/24 244/53 R |
| 2023/0242266 A1 | 8/2023 | Castelli |
| 2024/0213855 A1* | 6/2024 | Sugita .................... B64C 27/32 |

FOREIGN PATENT DOCUMENTS

| | | |
|---|---|---|
| EP | 3251882 B1 | 4/2018 |
| WO | 2002044024 A1 | 6/2002 |
| WO | 2016132280 A1 | 8/2016 |
| WO | 2021106549 A1 | 6/2021 |
| WO | 2021222528 A1 | 11/2021 |

OTHER PUBLICATIONS

Altaf, F.,"Thermal and State-of-Charge Balancing of Batteries using Multilevel Converters", Thesis for the Degree of Licentiate of Engineering, Department of Signals and Systems, Chalmers University of Technology, Göteborg, Sweden, 2014, 165 pages.

Andrea, D, "Battery Management Systems for Large Lithium-Ion Battery Packs", Artech House, 2010, 294 pages.

Christie, R. et al., "Cooling of Electric Motors Used for Propulsion on Sceptor", NASA/TM—2017-219134, 2017, 18 pages.

Clarke, S., et al., "X-57 Power and Command System Design", 2017 IEEE Transportation Electrification Conference and Expo (ITEC), Chicago, IL, USA, 2017, 8 pages.

De Boer, I. et al., "The Cooling of Pod-Mounted Avionic System", AGARD Conference Pre-Print No. 196 on Avionic Cooling and Power Supplies for Advanced Aircraft, 1977, 7 pages.

Dubois, A. et al., "Design of an Electric Propulsion System for SCEPTOR's Outboard Nacelle", 16th AIAA Aviation Technology, Integration, and Operations Conference, 2016, 30 pages.

Green, W., "The Observer's World Aircraft Directory", Glossary of Rotorcraft and V.T.O.L Terms, Frederick Warne & Co. Ltd., 1961, p. 134.

Jain, R., "Hover Predictions for the S-76 Rotor with Tip Shape Variation", 53rd AIAA Aerospace Sciences Meeting, 2015, 29 pages.

Kamlet, M., "X-57 Battery System Survives Flight-Condition, Thermal Runaway Testing", (https://www.nasa.gov/centers/armstrong/feature/X-57_battery_major_milestone.html), 2017, 3 pages.

Klein, G.D., "Linear Modeling of Tiltrotor Aircraft", Master of Science in Electrical Engineering & Master of Science in Aeronautical Engineering, Naval Postgraduate School, 1996, 222 pages.

Lee, T. E. et al., "Fluid Dynamics of Interacting Blade Tip Vortices", Journal of The American Helicopter Society, vol. 55, 2010, 18 pages.

Leishman, J.G., "Principles of Helicopter Dynamics", Cambridge University Press 978-1-107-01335-3, 20001 25 pages.

Mertaugh, L.J., "ALQ-164 PODAV-8C Environmental Evaluation Flight Test", Defense Technical Information Center, Naval Air Test Center Patuxent River, 1981, 159 pages.

National Standard of the PRC, Electric Vehicle Conductive Charging System Part 1 General Requirements (Dec. 28, 2015), 62 pages.

Orion BMS Manual, Strings, Parallel Cells, and Parallel Strings, (https://www.orionbms.com/manuals/pdf/parallel_strings.pdf), 2016, 17 pages.

Price, D.C. et al., "Thermal Design of an Airborne Computer Chassis", Journal of Heat Transfer, vol. 127, 2005, 7 pages.

Renaud, T., et al., "Evaluation of Isolated Fuselage and Rotor-Fuselage Interaction Using CFD", American Helicopter Society 60th Annual Forum, 2004, 15 pages.

RTCA Special Committee SC-225, "Minimum Operational Performance Standards for Rechargeable Lithium Batteries and Battery Systems", RTCA DO-311A, Dec. 2017, 94 pages.

Smith, M.J., et al., "Evaluation of Rotor Hover Performance with Differing Blade Tip Shapes", AIAA SciTech Forum, 53rd AIAA Aerospace Sciences Meeting, 2015, 23 pages.

(56) References Cited

OTHER PUBLICATIONS

Weeden, J., et al., "Making better use of parallel battery strings at solar sites by the inclusion of a simple monitoring module", INTELEC—Twentieth International Telecommunications Energy Conference, 1998, pp. 204-209.
Yang, N. et al., "Study on the Charging Behaviors of Lithium-Ion Batteries by Analysis of Li Distribution in the Electrode Particles", ECS Transactions, 66 (9), 2015, pp. 215-229.
Hsu, C. et al., "Increased Energy Delivery for Parallel Battery Packs with No Regulated Bus", IEEE 10.1109/INTLEC.2012.6374507, 2012, 8 pages.
Gessow, A, et al., "Aerodynamics of the Helicopter", Frederick Ungar Publishing Co., 1952, p. 48.
Johnson, A., "Rotocraft Aeromechanics", Cambridge University Press, 2013, pp. 124-125.
International Search Report and Written Opinion of counterpart PCT application, dated Feb. 26, 2024 (PCT/US2023/079676), 9 pages.
International Search Report and Written Opinion of the International Search Authority in International Application No. PCT/US2023/083662 dated Sep. 8, 2024 (22 pages).

\* cited by examiner

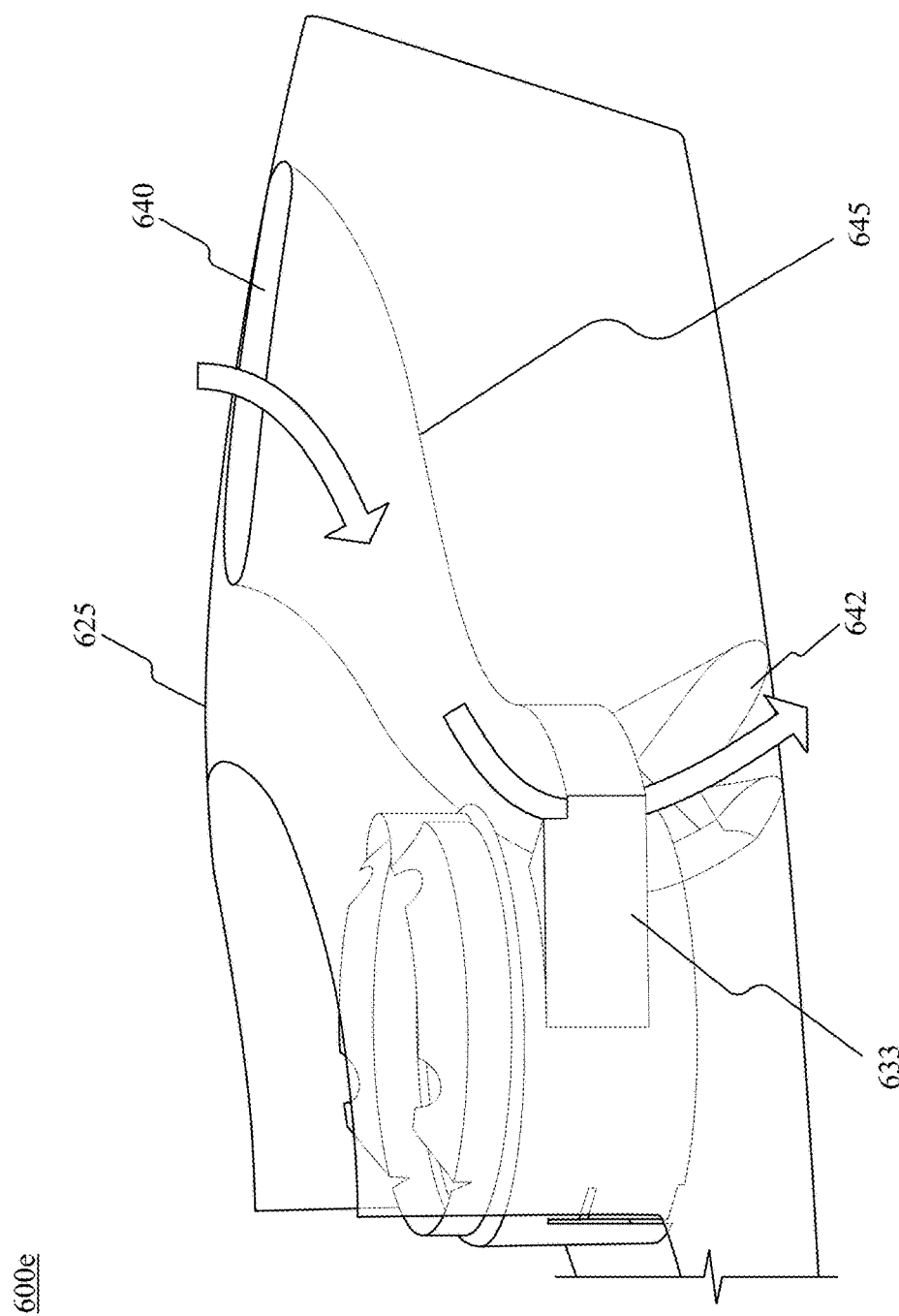

SYSTEMS AND METHODS FOR LIFTER MOTOR COOLING IN EVTOL AIRCRAFT

CROSS-REFERENCE TO RELATED APPLICATIONS

The present application is a continuation application of U.S. application Ser. No. 18/163,372, filed Feb. 2, 2023 titled "System and Methods for Lifter Motor Cooling in eVTOL Aircraft," which is a continuation of U.S. application Ser. No. 18/055,268, filed Nov. 14, 2022 (now U.S. Pat. No. 11,613,350) titled "Systems and Methods for Lifter Motor Cooling in eVTOL Aircraft," which claims priority under 35 U.S.C. § 119 to U.S. Provisional Patent Application No. 63/378,680, filed Oct. 7, 2022, titled "Systems and Methods for Improved Propulsion Systems for eVTOL Aircraft". The entire contents of the aforementioned applications are incorporated herein by reference for all purposes.

TECHNICAL FIELD

This disclosure relates generally to the field of powered aerial vehicles. More particularly, and without limitation, the present disclosure relates to innovations in eVTOL aircraft that use electrical propulsion systems. Certain aspects of the present disclosure generally relate to cooling paths for motors, such as lift motors of powered aerial vehicles. Other aspects of the present disclosure generally relate to improvements in motor that may be used in other types of vehicles but provide particular advantages in aerial vehicles.

SUMMARY

Some embodiments of the present disclosure provide a lift apparatus for a vertical takeoff and landing (VTOL) craft. The lift apparatus may comprise: a lift propeller; a propeller controller electrically coupled to the lift propeller, the propeller controller located within a controller enclosure; a heat exchanger comprising fins that are located external to the controller enclosure, the heat exchanger fins being thermally coupled to the propeller controller by an oil flow path; a boom; a fairing; an air inlet located at a top side of the fairing, the air inlet configured to receive downwash from the lift propeller during a lift phase; a cooling path configured to direct the downwash to cool the heat exchanger fins; and an air outlet, the air outlet configured to exhaust the downwash from the heat exchanger fins.

BRIEF DESCRIPTIONS OF FIGURES

Figure 4A:
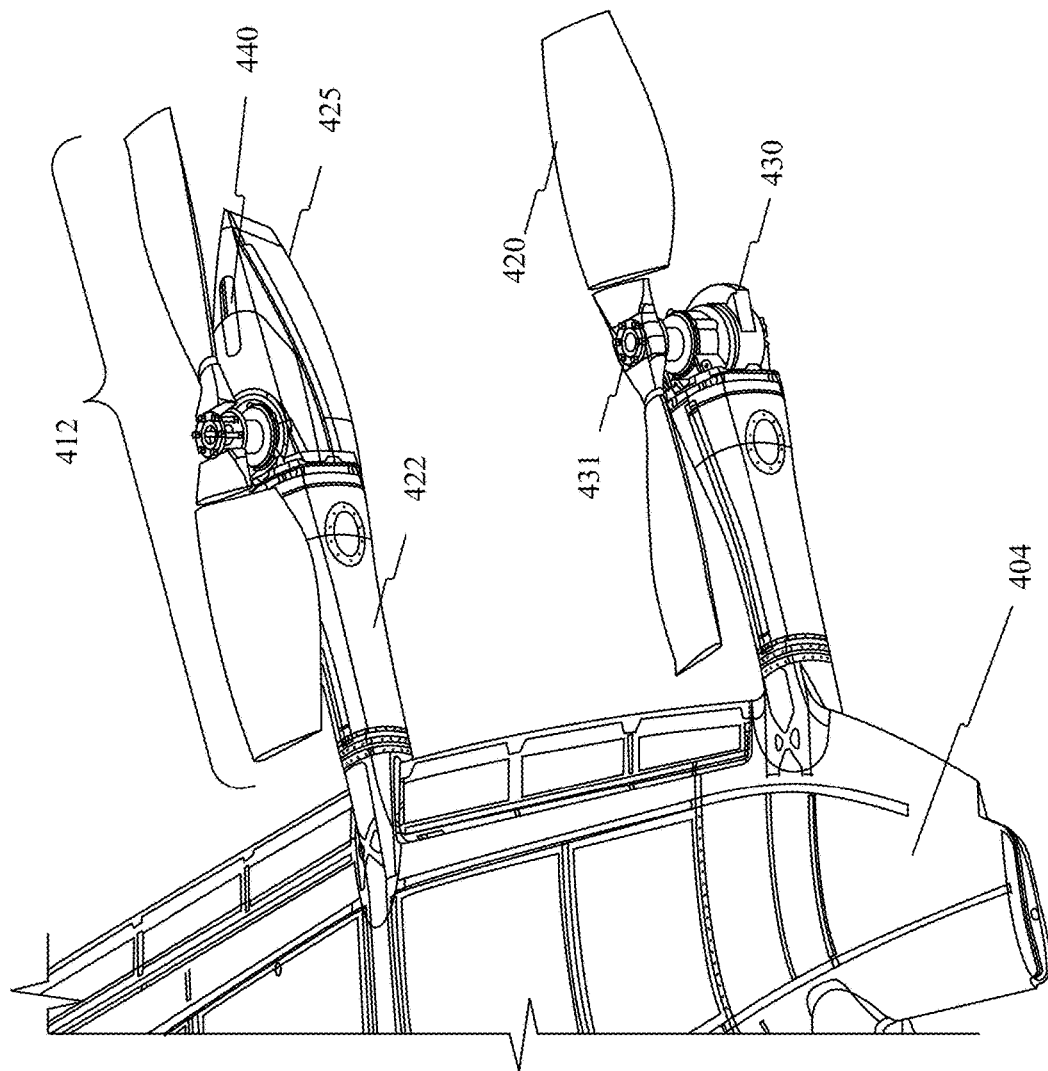
Figure 4B:
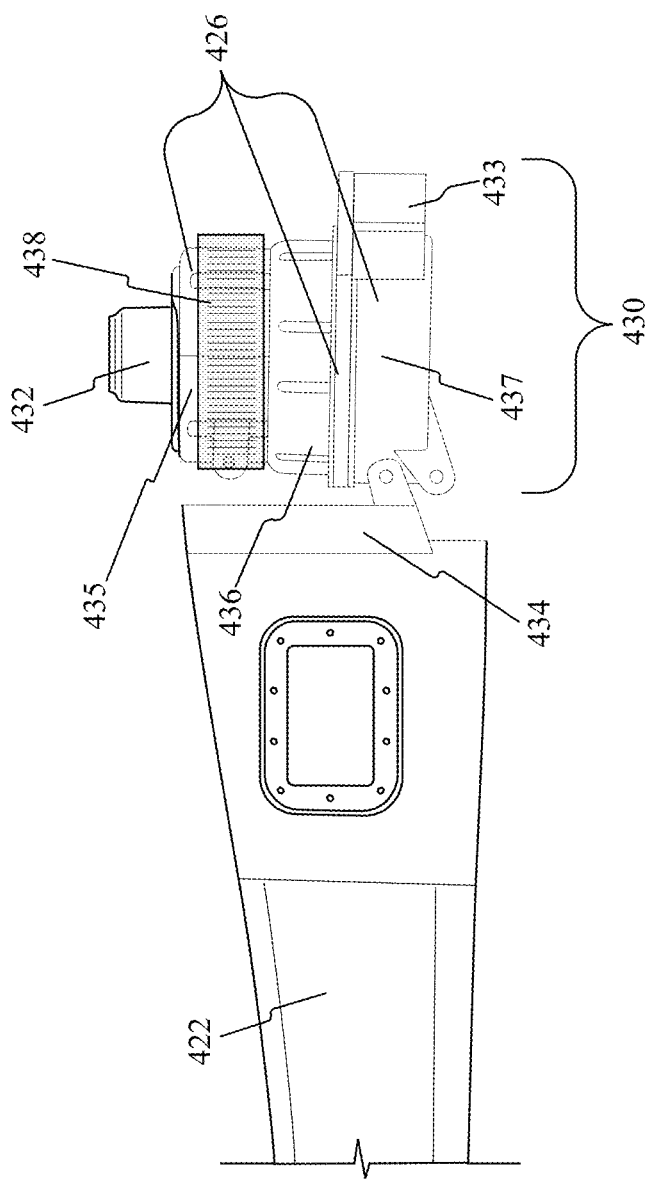
Figure 4C:
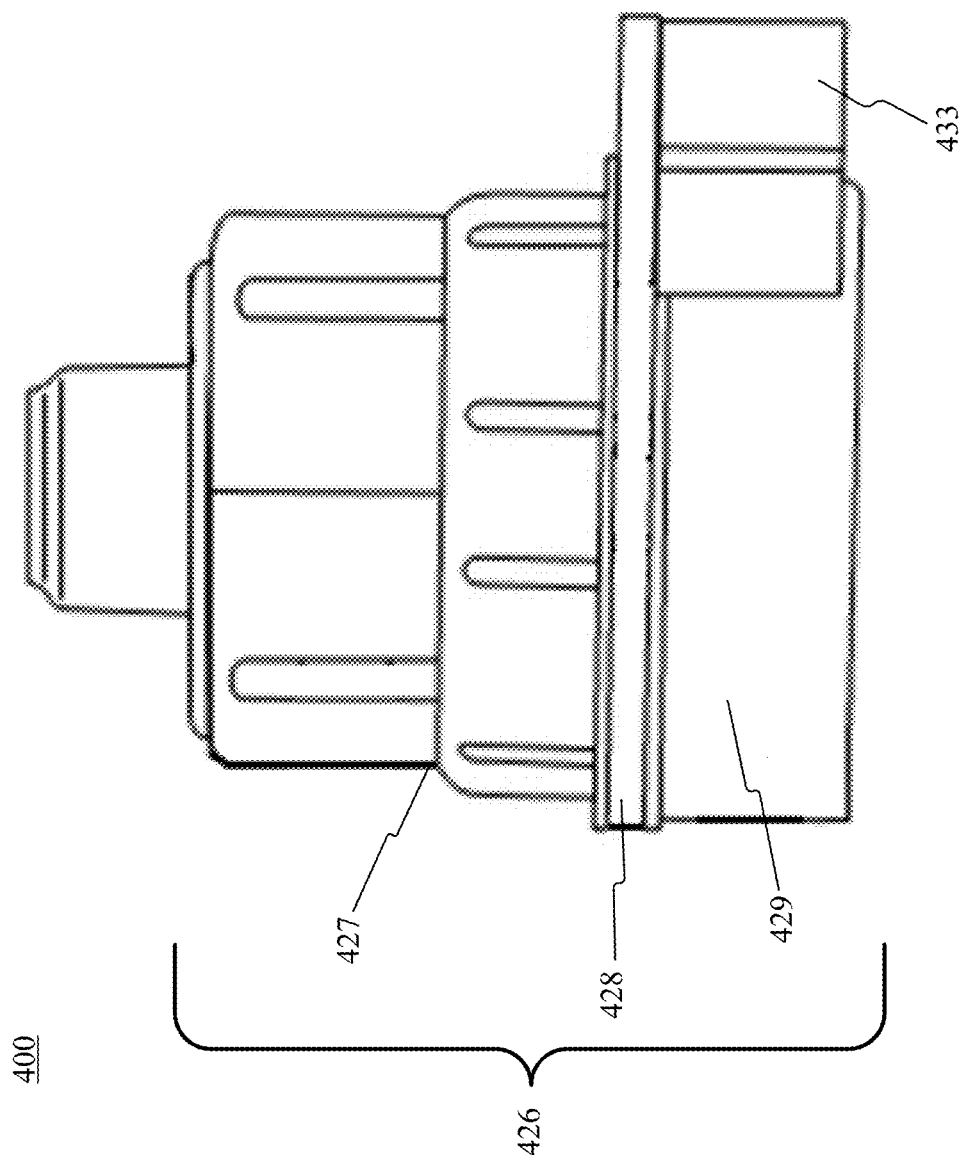

FIGS. 4A-C are schematic diagrams illustrating an exemplary lift propeller and motor assembly in VTOL aircraft, consistent with embodiments of the present disclosure.

Figure 5A:
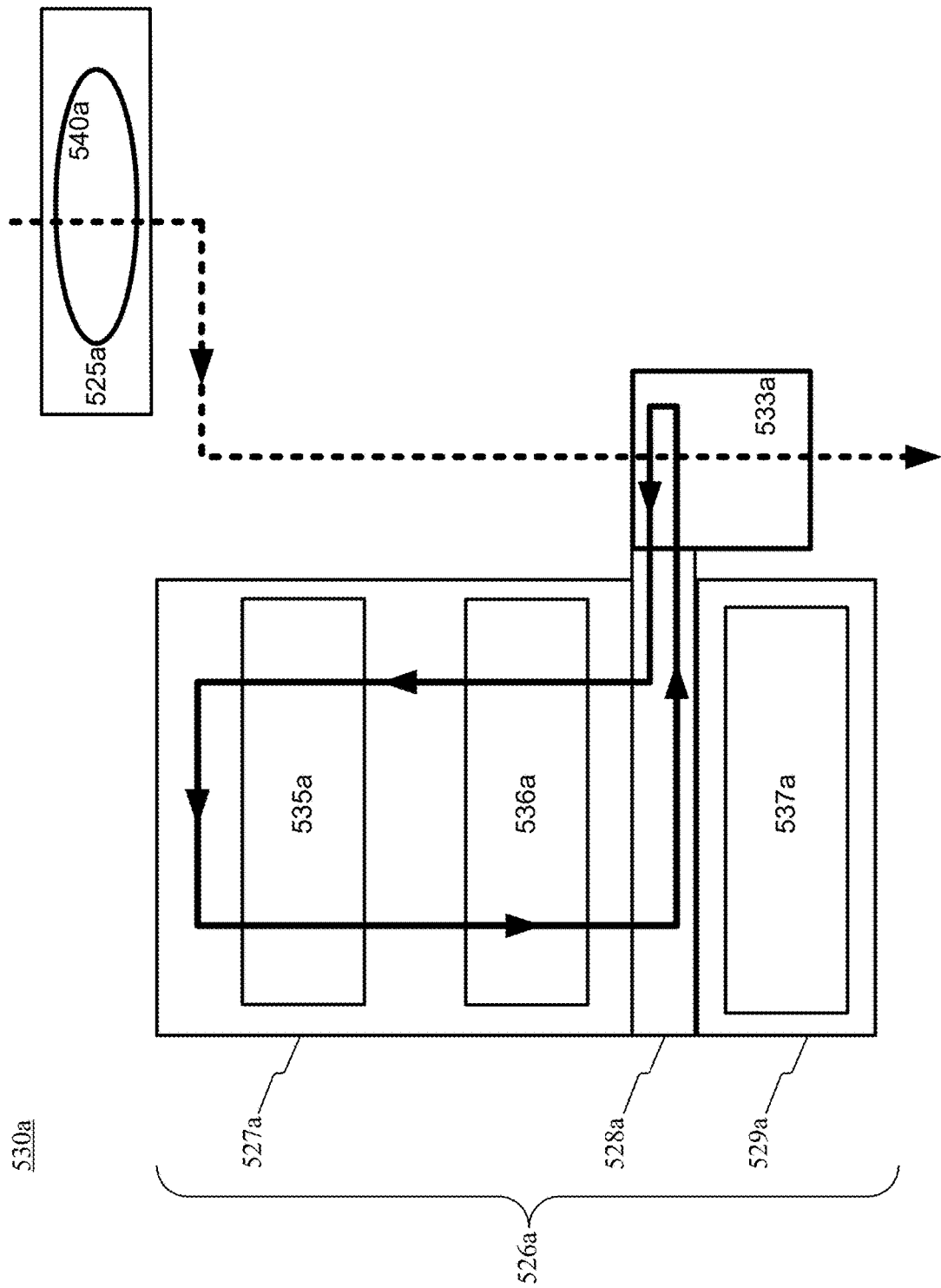
Figure 5B:
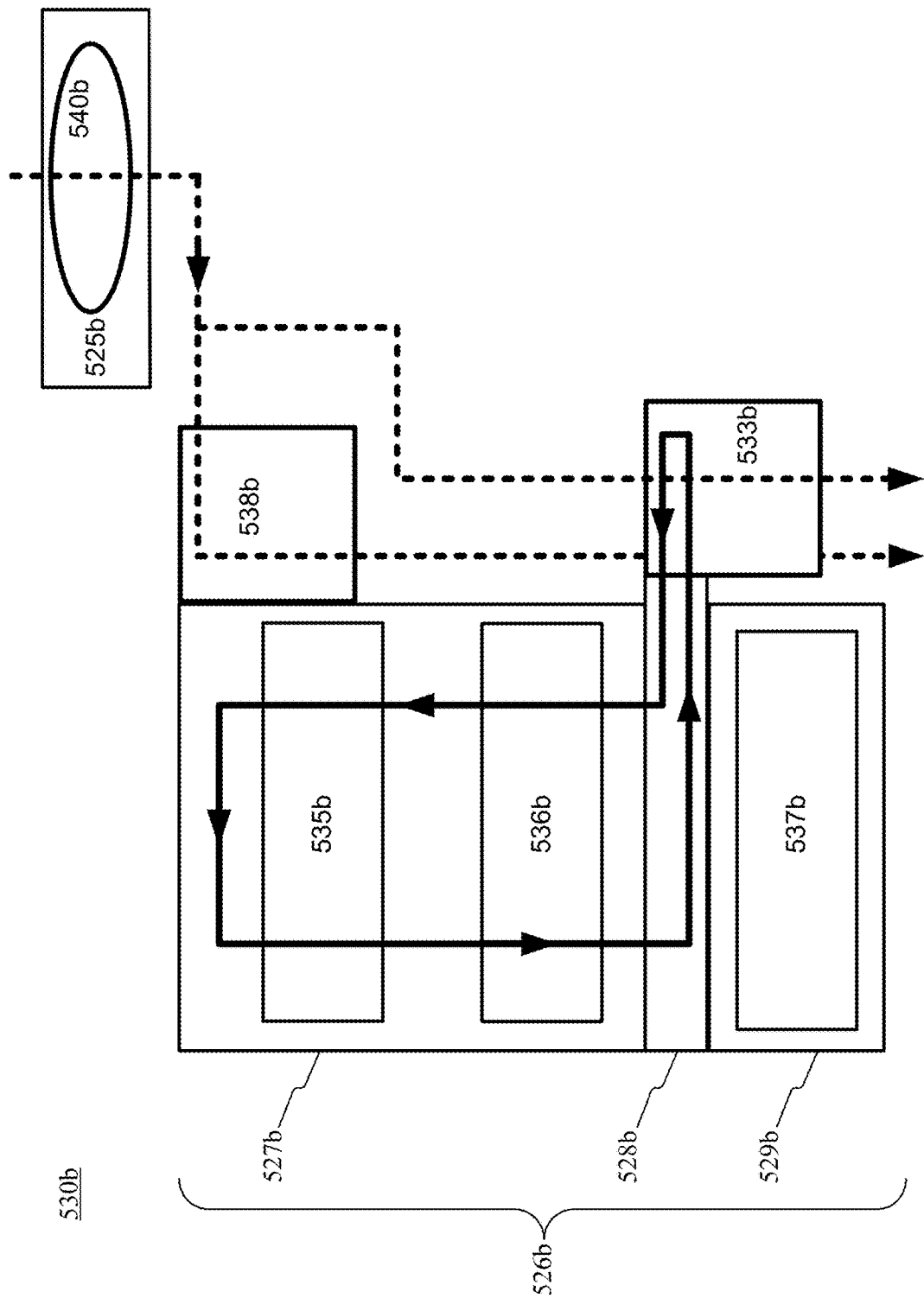
Figure 5C:
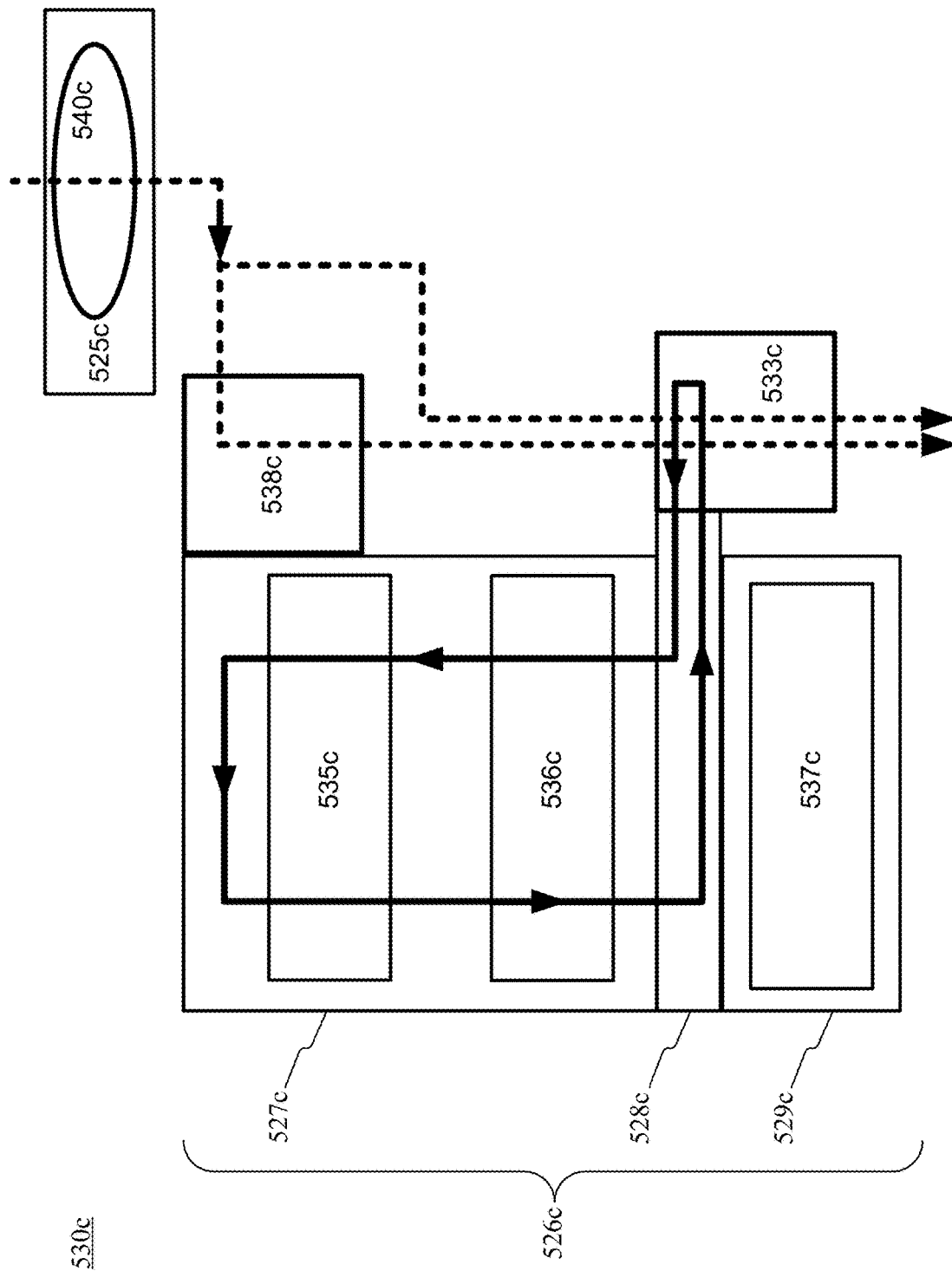
Figure 5D:
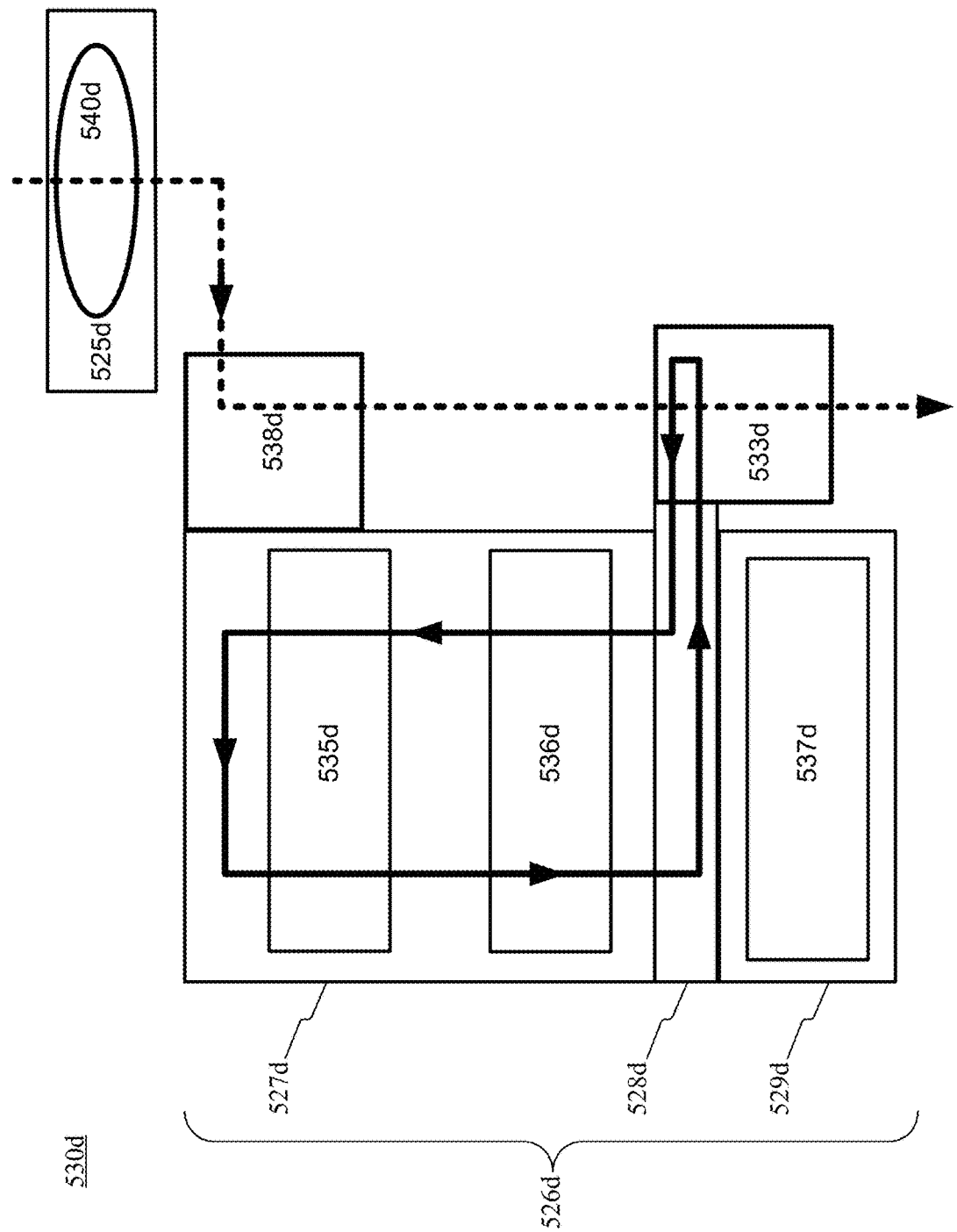
Figure 5E:
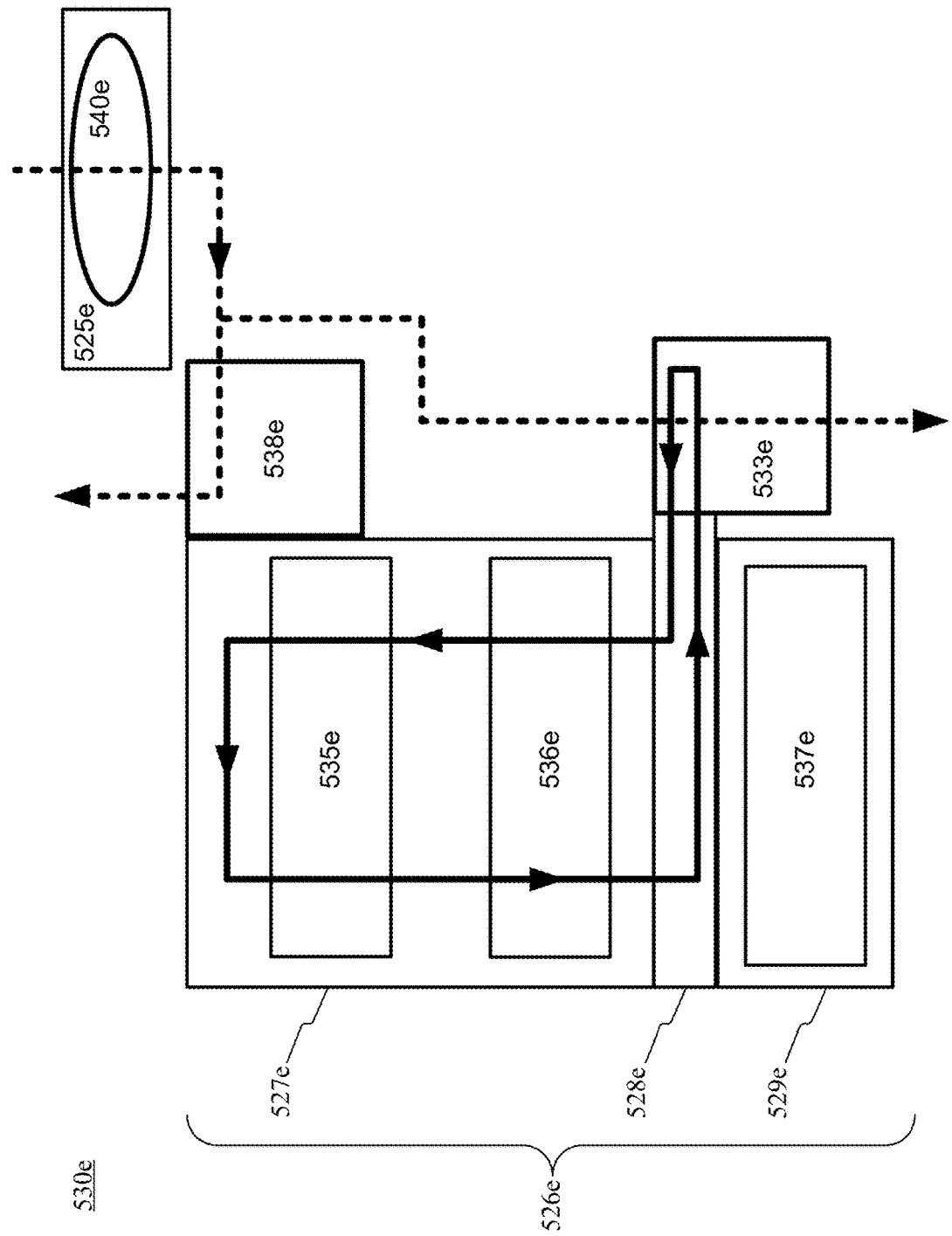
Figure 5F:
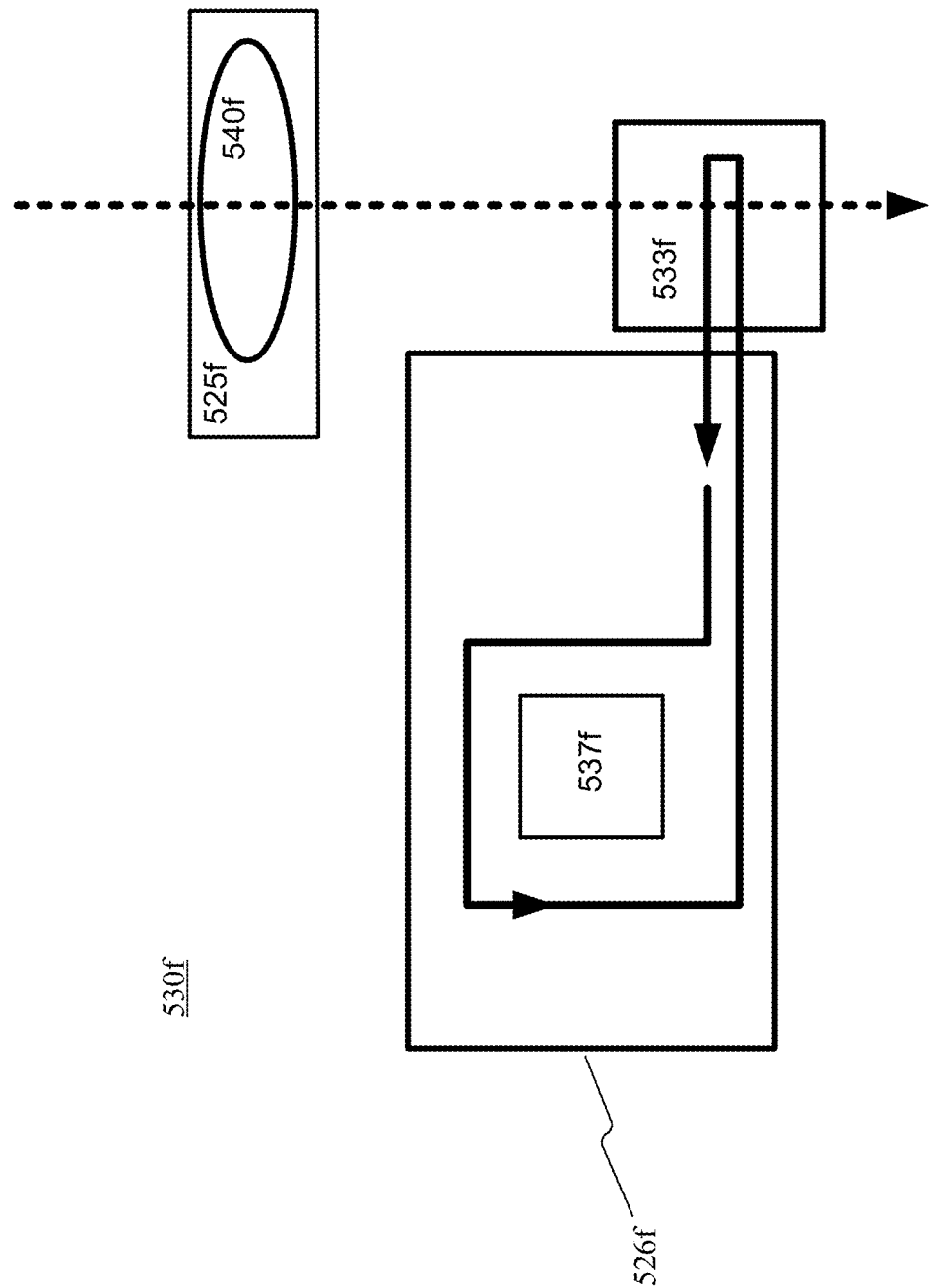
Figure 5G:
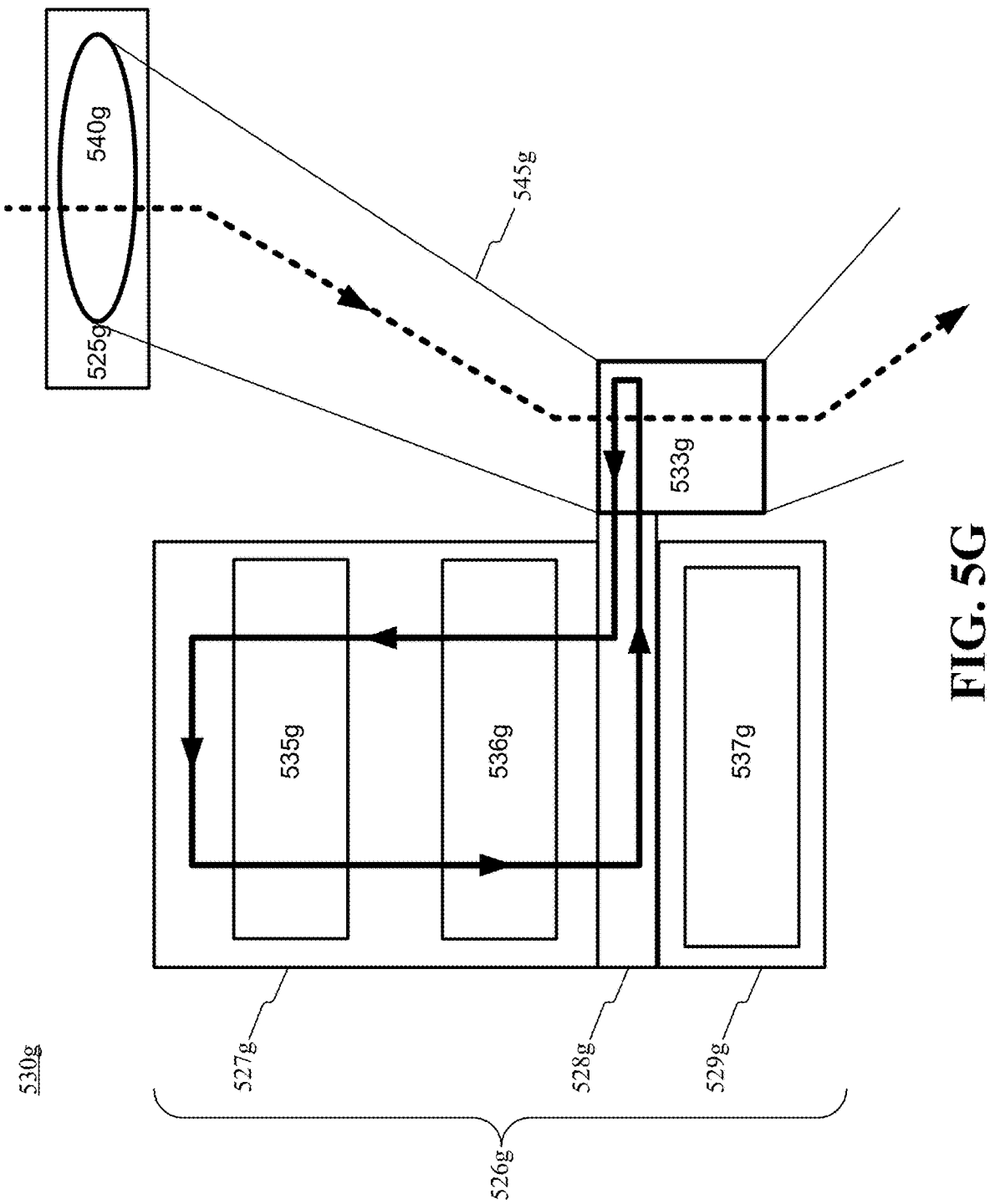
Figure 5H:
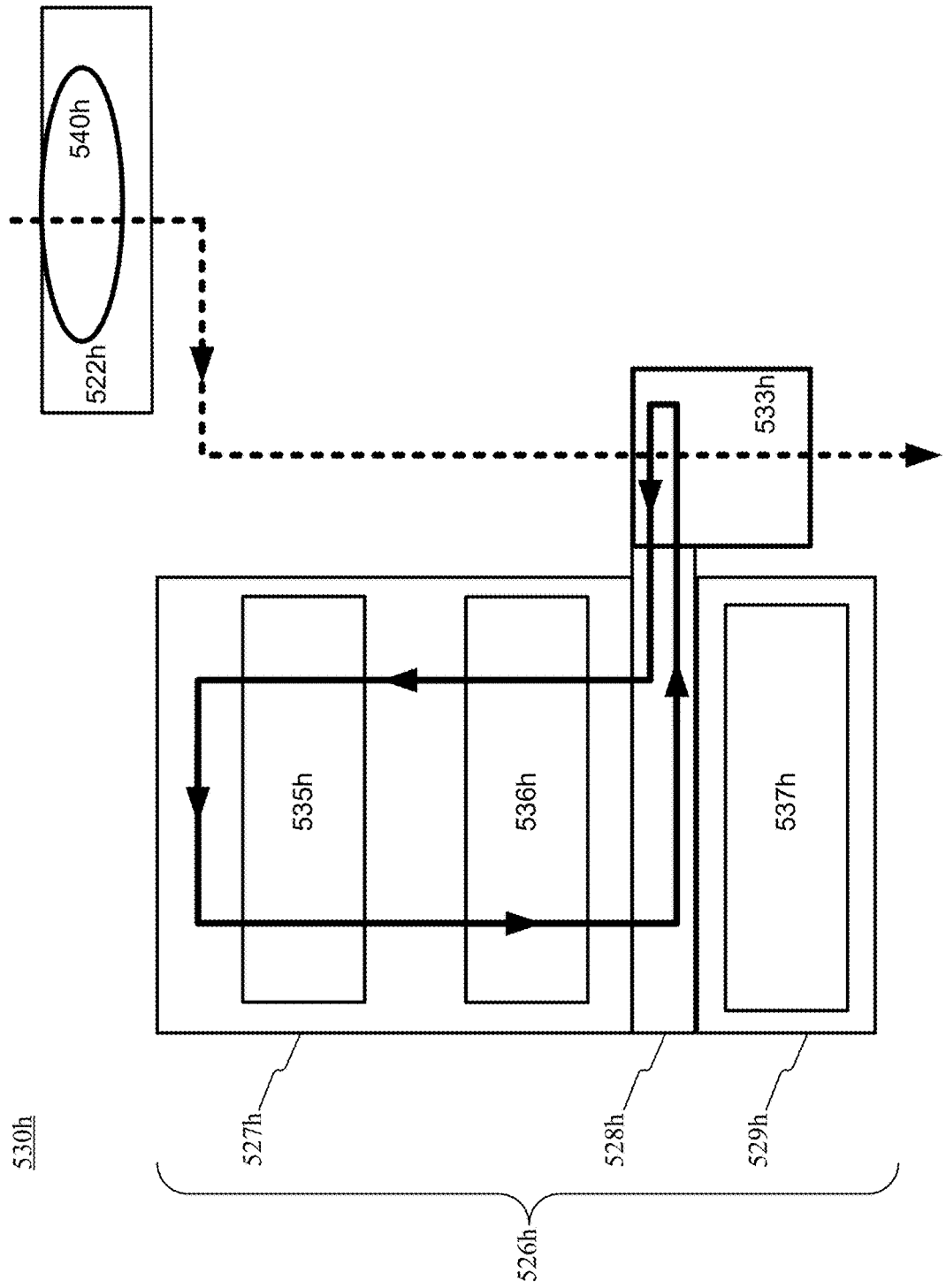
Figure 5I:
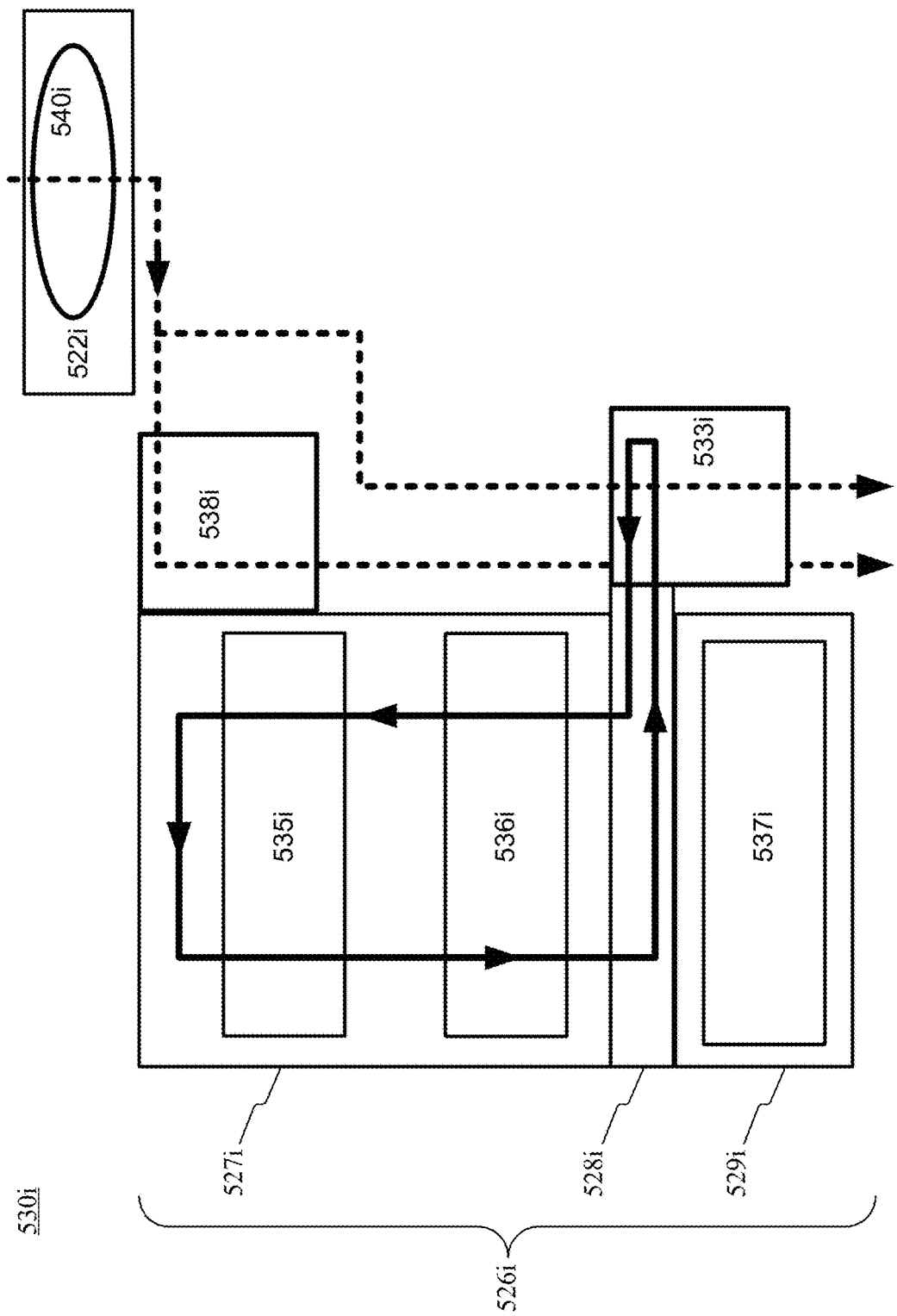
Figure 5J:
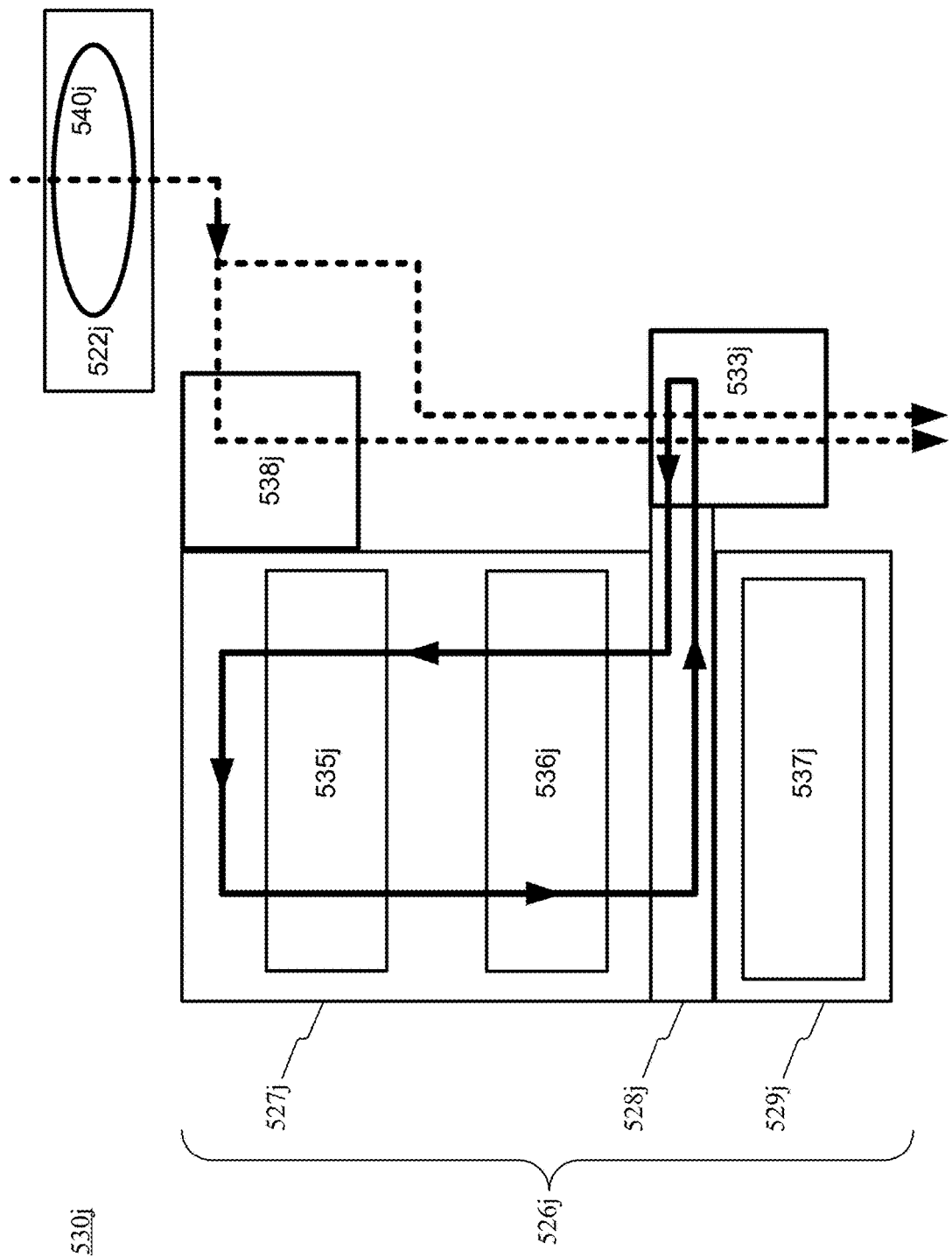
Figure 5K:
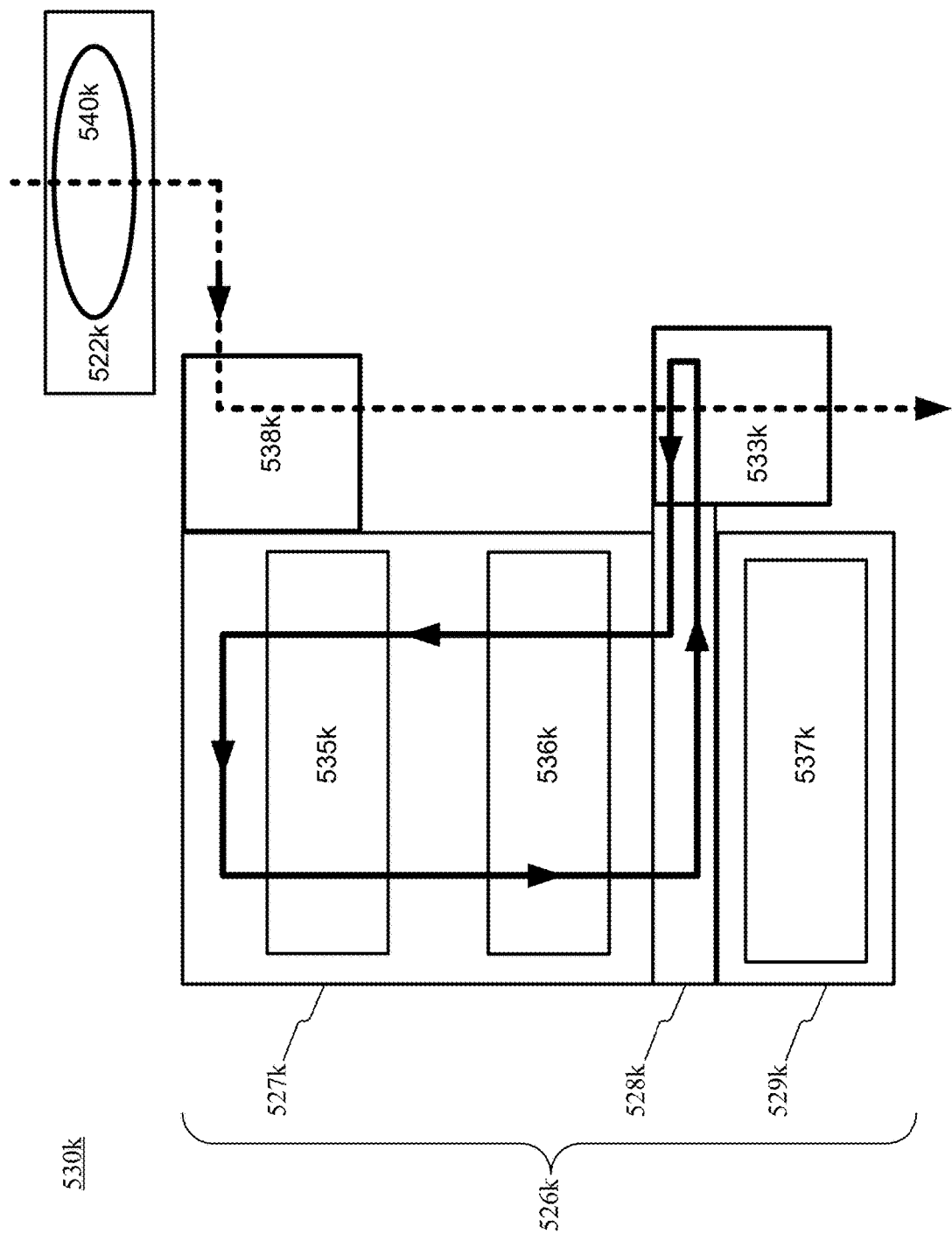
Figure 5L:
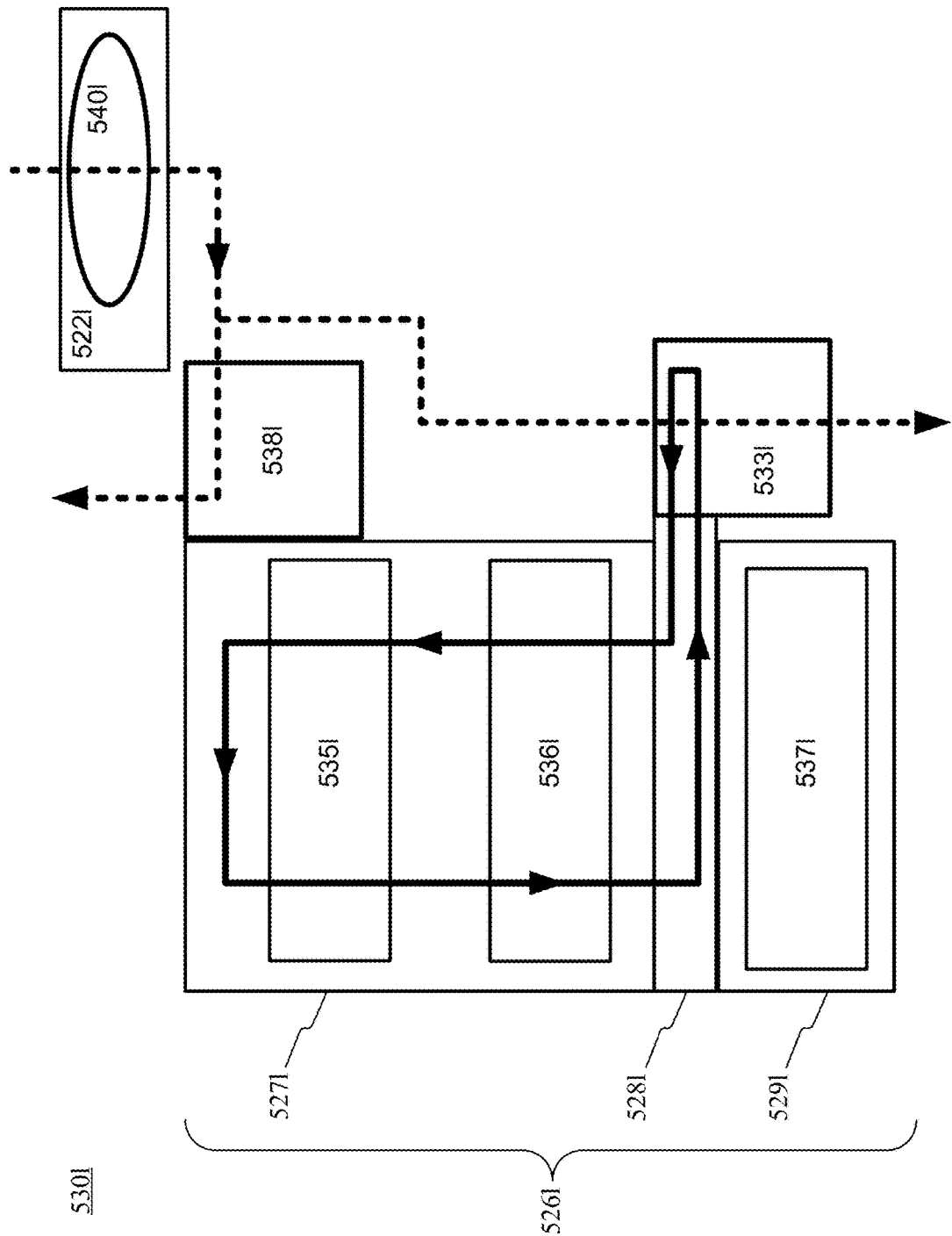
Figure 5M:
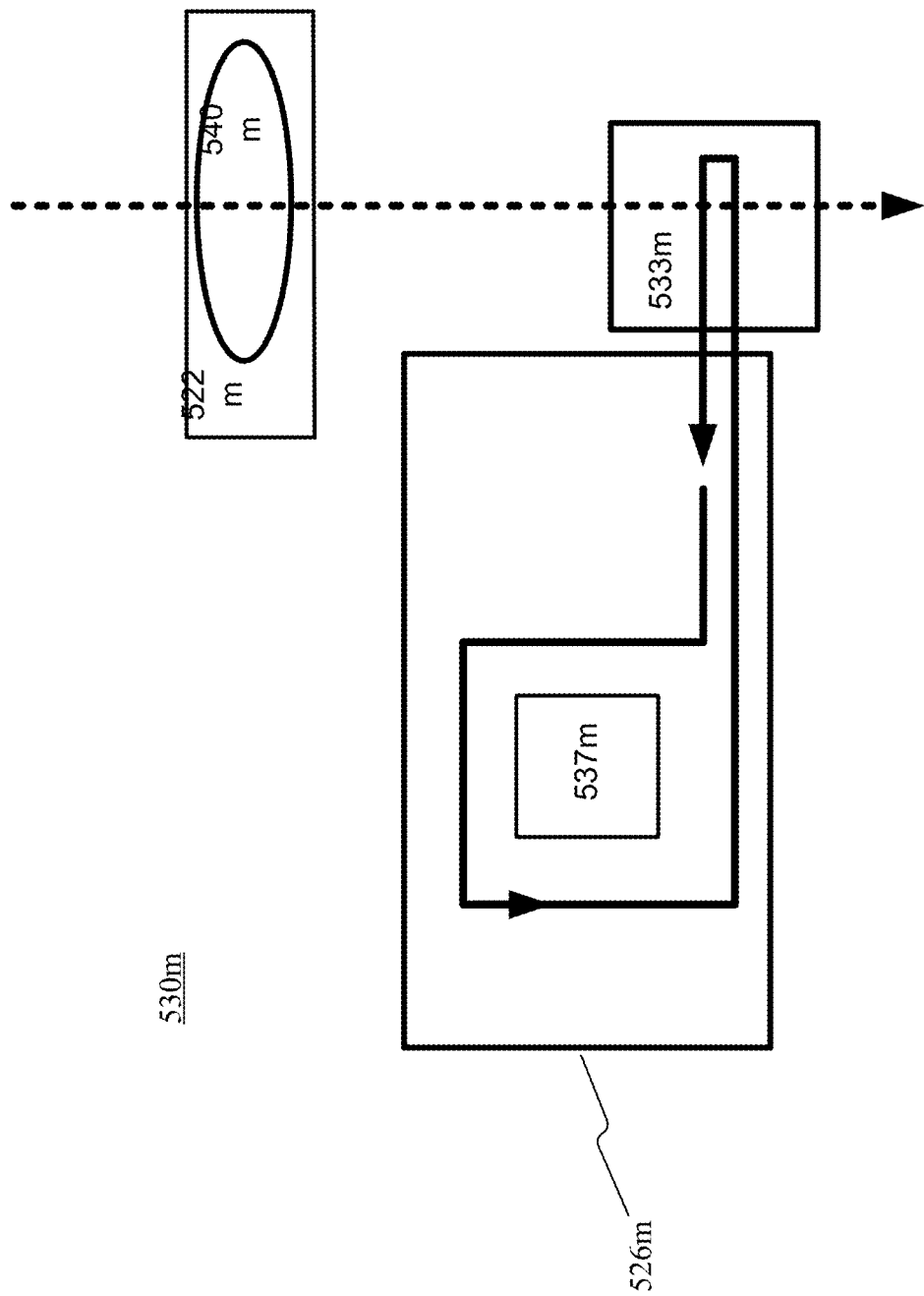
Figure 5N:
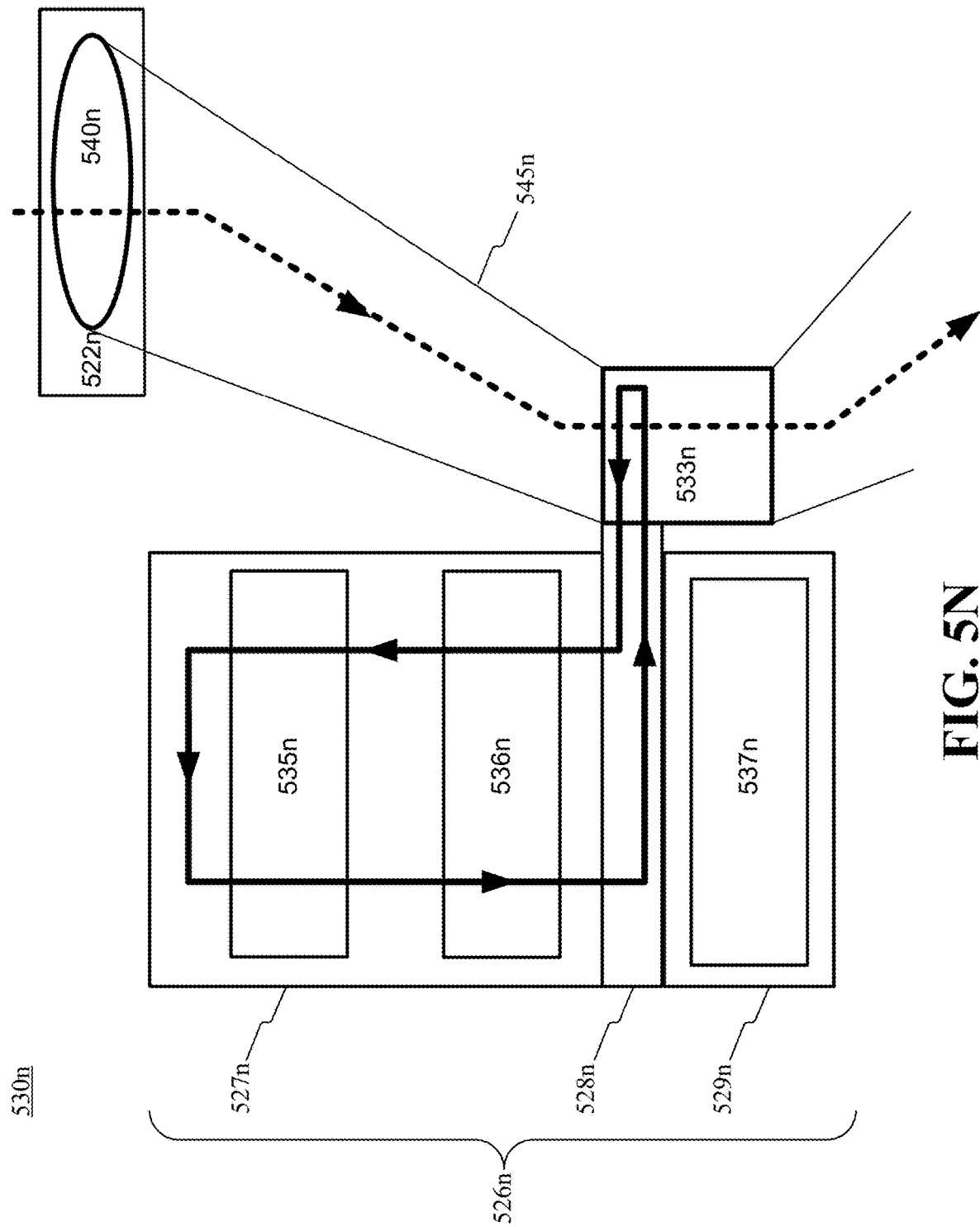

FIGS. 5A-N are schematic diagrams illustrating example oil and airflow paths in a motor assembly and surrounding areas of a VTOL aircraft, consistent with embodiments of the present disclosure.

FIGS. 6A-E are schematic diagrams illustrating example airflow path arrangements in portions of VTOL aircraft, consistent with embodiments of the present disclosure.

Figure 7A:
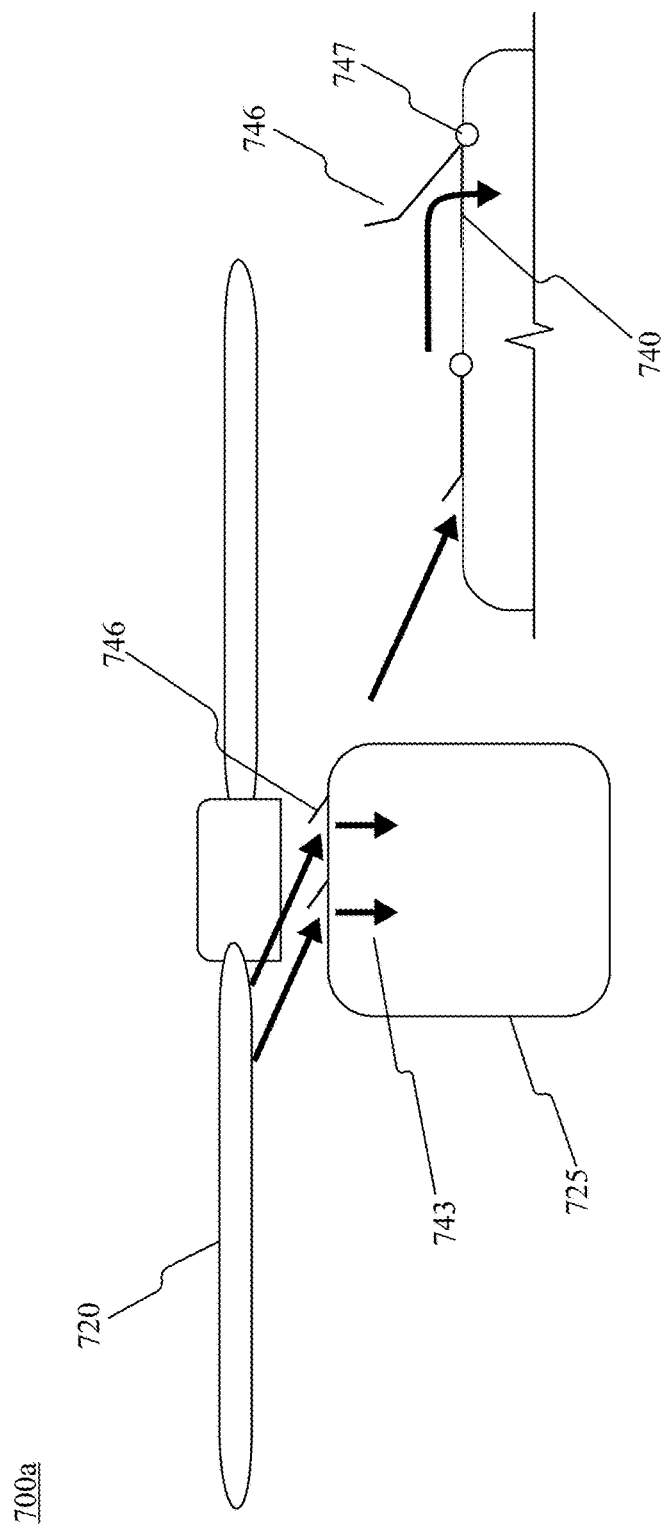
Figure 7B:
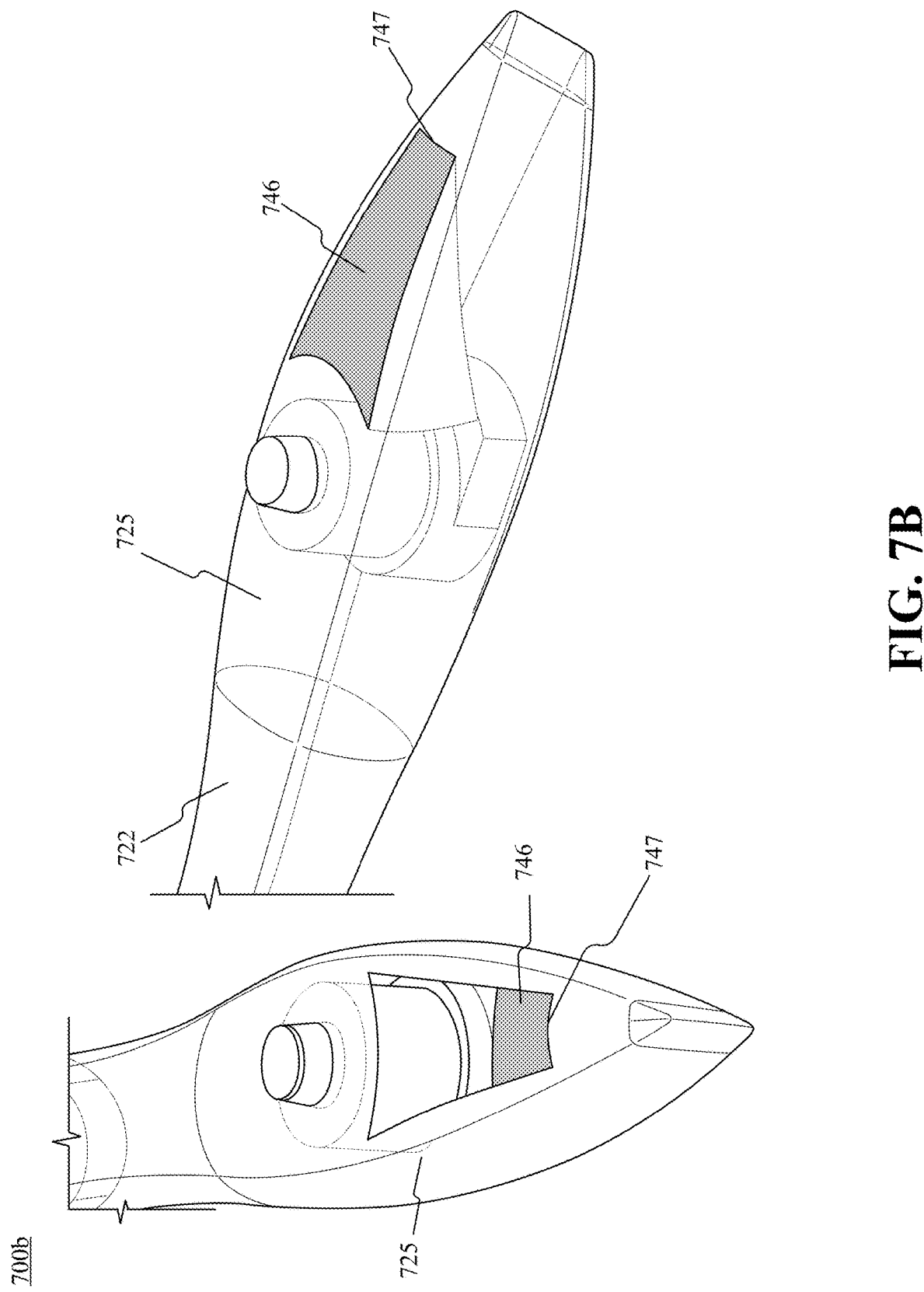

FIGS. 7A-B are schematic diagrams illustrating example door arrangements in portions of VTOL aircraft, consistent with embodiments of the present disclosure.

Figure 8:
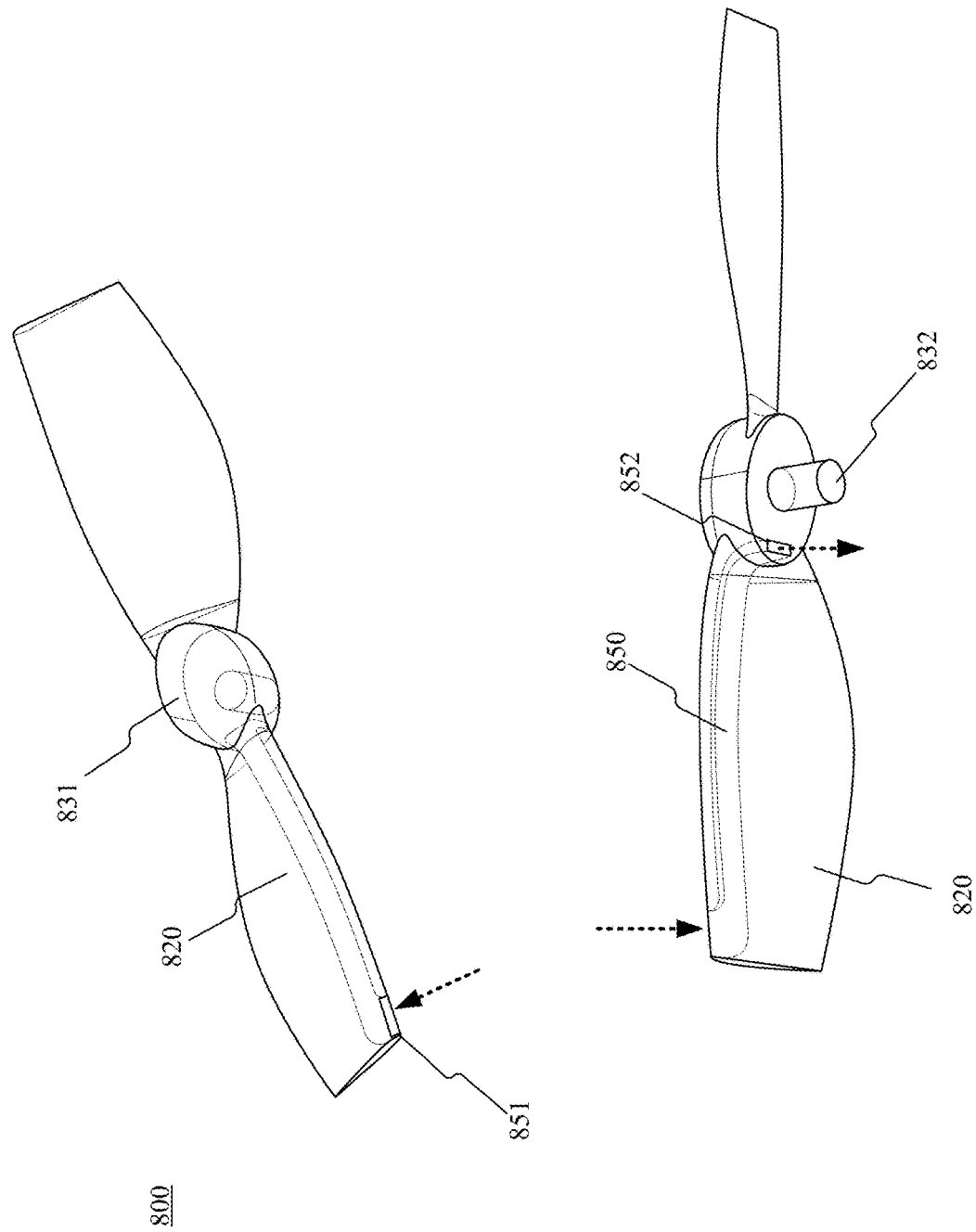

FIG. 8 is a schematic diagram illustrating an auxiliary feature in portions of VTOL aircraft, consistent with embodiments of the present disclosure.

Figure 9A:
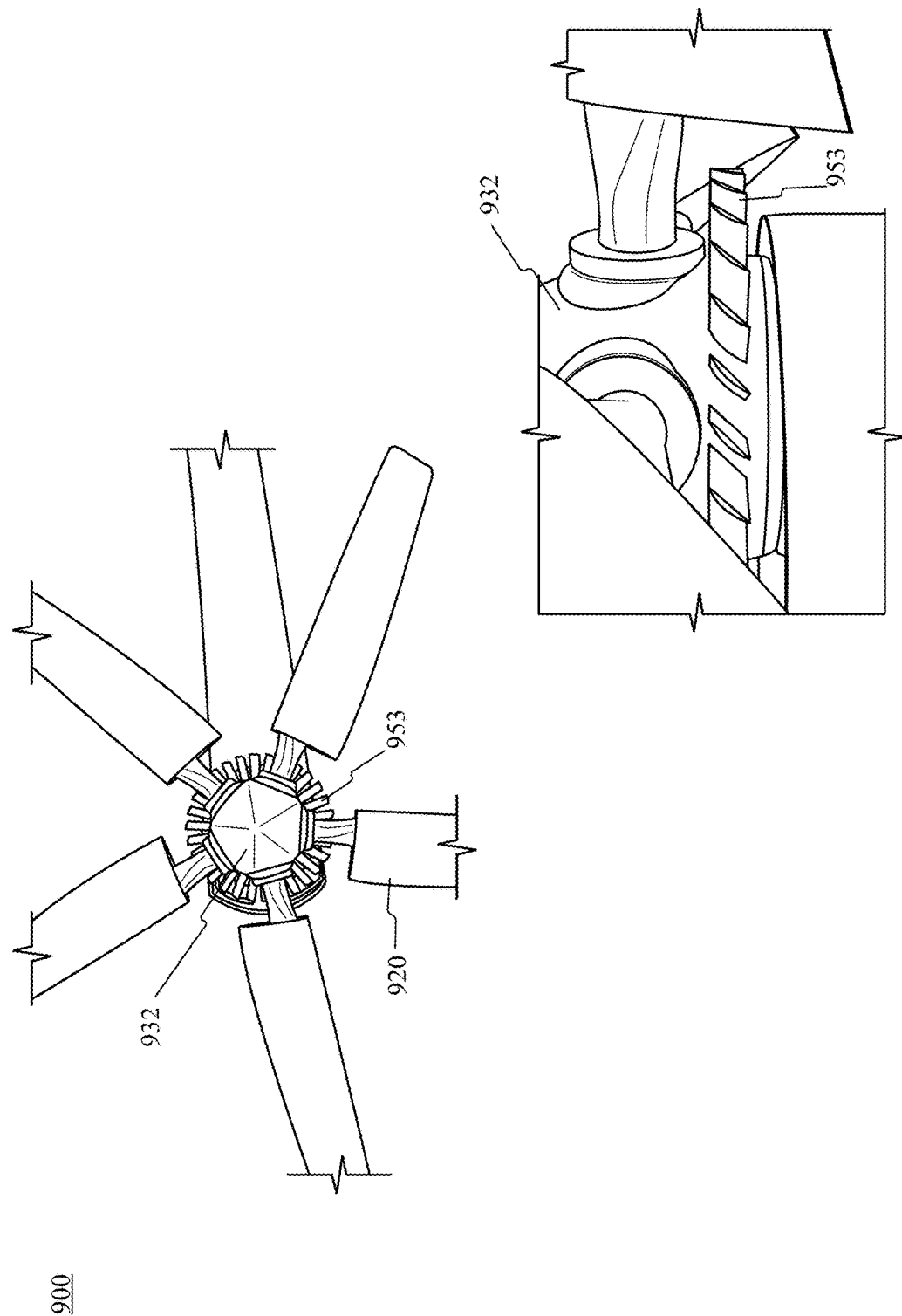
Figure 9B:
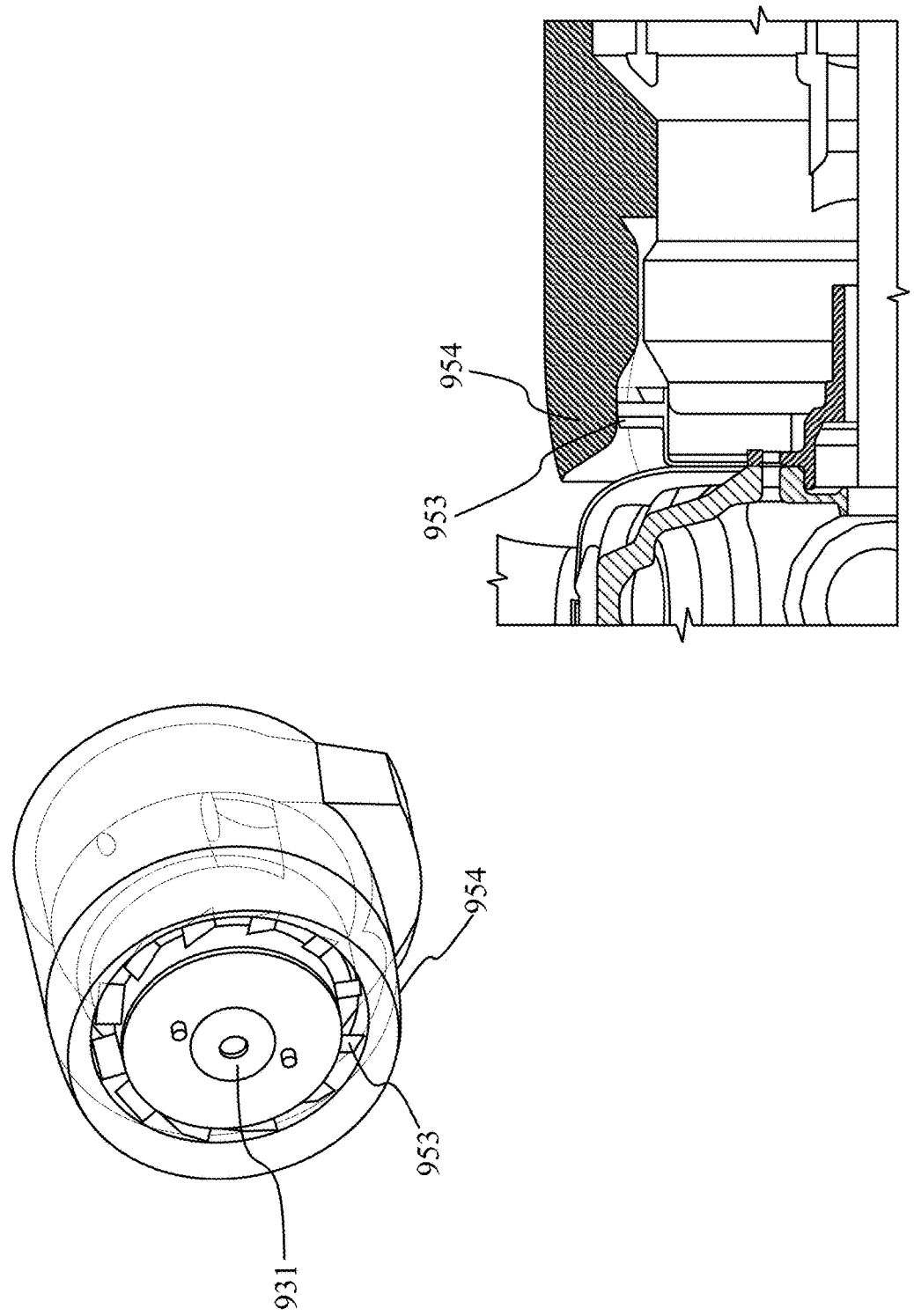

FIGS. 9A-B are schematic diagrams illustrating an auxiliary feature in portions of VTOL aircraft, consistent with embodiments of the present disclosure.

DETAILED DESCRIPTION

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per work day), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing a non-hazardous quantity of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone. In some embodiments, the flammable fluid may comprise oil, and the non-hazardous quantity may be less than one quart, or two quarts, or three quarts, or four quarts, or five quarts, or ten quarts, as determined based on factors such as the size, number of propellers, or payload of the aircraft, etc.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a enclosure that is cantilevered off of the rear of the motor and may be air cooled. It is recognized that such an inverter orientation may not be an optimum configuration in terms of the enclosure required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor enclosure. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator enclosure, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to four or more liters of air within the motor-gearbox enclosure which is in contact with engine oil. For example, an electric engine may possess up to five liters, or six liters, or eight liters, or ten liters, or twenty liters of air within the motor-gearbox enclosure which is in contact with engine oil, based upon factors such as the size, number of propellers, or payload of the aircraft, etc. Embodiments of a motor-gearbox enclosure may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the Overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

During takeoff, landing, hover and cruise, motors and related control components of the VTOL aircraft may generate heat. The heat must be dissipated to prevent degradation or damage to the motor, control components and other elements of the VTOL aircraft. For some types of VTOL aircraft, such as electric VTOL (eVTOL) aircraft, thermal control is likewise important to maintain optimal energy efficiency of, e.g., battery-powered components.

Some elements may generate high thermal loads only during certain operational periods. For example, some lift propellers may be used only during takeoff, landing, and hover, and may be shut off during cruise. Therefore, such lift propellers may generate a high thermal load during takeoff, landing, and hover, and generate little or no heat during cruise.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

In some embodiments, VTOL aircraft described herein include at least one fixed wing, a plurality of lift propellers that are fixed for providing lift during take-off, landing, and hover, and a plurality of tilt propellers that are tiltable from lift configurations for providing lift to cruise configurations for providing the forward thrust needed for the at least one fixed wing to provide the lift to the aircraft. By configuring the VTOL aircraft so that a portion of the propulsion system is dedicated to lift and a portion of the propulsion system is used during both lift and forward flight, the aircraft can be lighter and have lower drag than VTOL aircraft that have separate lift and propulsion systems and VTOL aircraft that use all propulsion for both lift and forward flight. Winged VTOL aircraft that have separate propulsion systems for vertical propulsion and forward propulsion essentially waste the forward propulsion system during vertical take-off and landing and hover. In contrast, aircraft according to the principles described herein utilize the forward propulsion system during vertical take-off and landing, which can result in a relatively light propulsion system overall. Winged VTOL aircraft that tilt all of their propellers have limited places to position the propellers (propellers must be positioned forward and rearward of the center of gravity but their positioning is limited by the other propellers and the wings), which often results in relatively fewer, and therefore larger, propellers. In contrast, propulsion systems according to the principles described herein can have relatively smaller, lighter weight, and lower drag propellers. Thus, aircraft in some embodiments described here have an ideal balance between a dedicated lift propulsion system and a tiltable propulsion system.

As used herein, the term "tilt propeller" refers to a variable pitch propeller configured to provide thrust for vertical lift and forward propulsion by varying the pitch of the propeller. The term "lift propeller" may refer to a fixed-pitch propeller configured to provide thrust for vertical lift.

Figure 1:
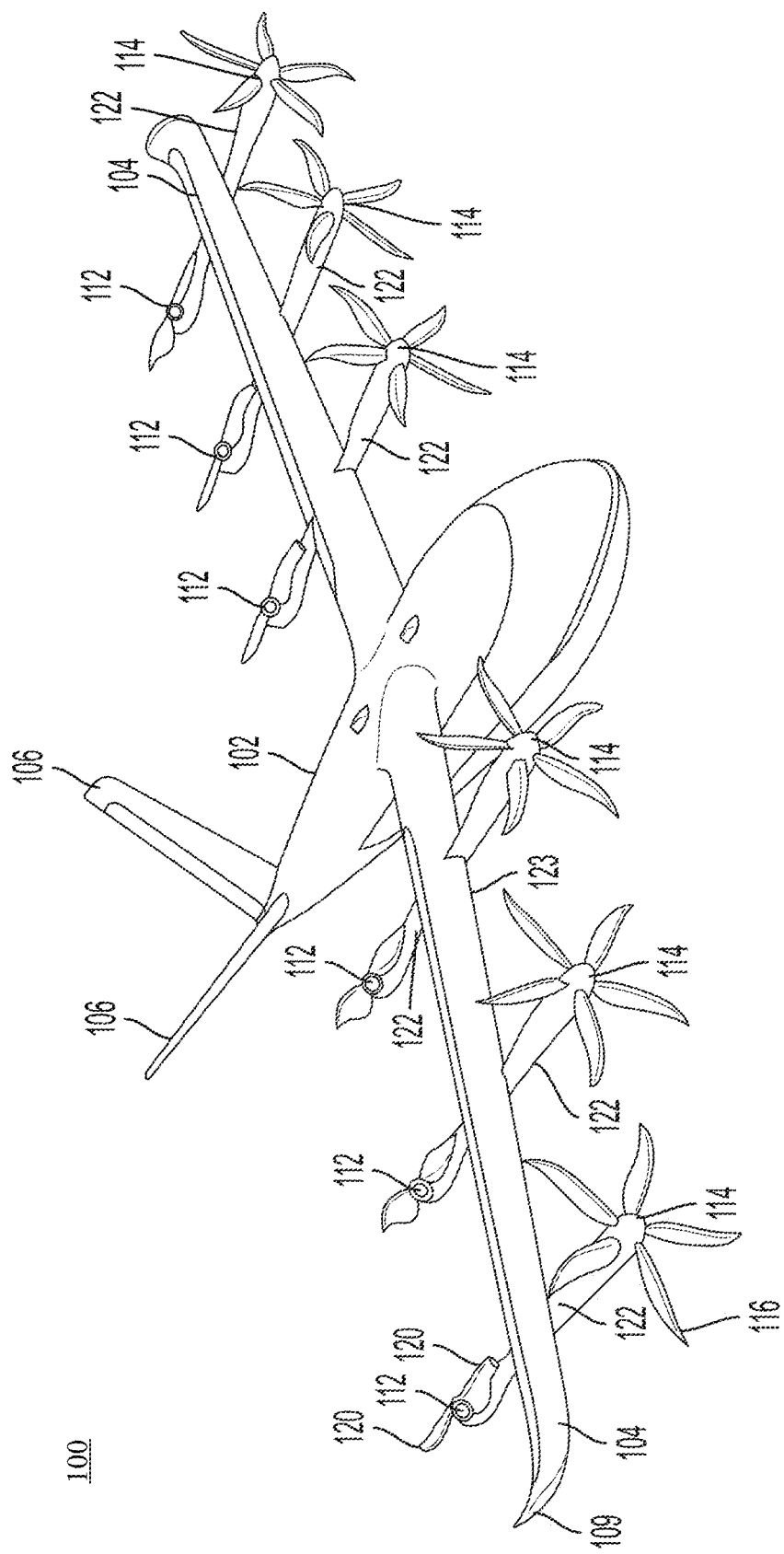
FIG. 1 is a schematic diagram illustrating an exemplary VTOL aircraft, consistent with disclosed embodiments.
Figure 2:
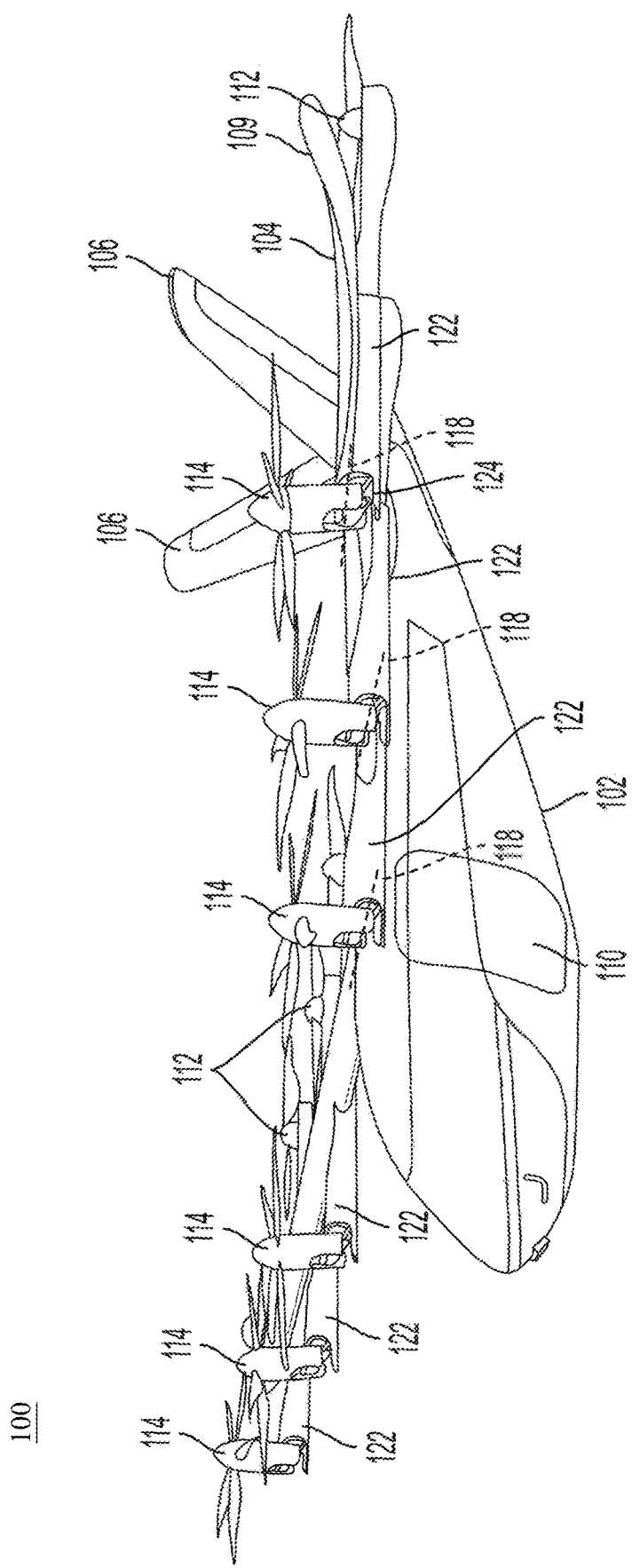
FIG. 2 is a schematic diagram illustrating an exemplary VTOL aircraft, consistent with embodiments of the present disclosure.

FIGS. 1 and 2 illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, and one or more rear stabilizers 106 mounted to the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed downwardly for providing additional lift.

For forward flight, tilt propellers 114 may tilt from their lift configurations to their cruise configurations. In other words, the pitch of tilt propellers 114 may be varied from a pitch in which the tilt propeller thrust is directed downward (to provide lift during vertical take-off, landing and hover) to a pitch in which the tilt propeller thrust is directed rearward (to provide forward thrust to aircraft 100). The tilt propellers may tilt about axes 118 that may be perpendicular to the forward direction of the aircraft 100. When the aircraft 100 is in full forward flight, lift may be provided entirely by wings 104. Meanwhile, in the cruise configuration, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1. In some embodiments, lift propellers 112 have more than two blades. In some embodiments, tilt propellers 114 include more blades 116 than lift propellers 112. For example, as illustrated in FIGS. 1 and 2, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge 124. Tilt propeller 114 may be mounted to boom 122 such that tilt propeller 114 is aligned with the body of boom 122 when in its cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps and/or ailerons. According to some embodiments, the wings may have curved wing tips 109 for reduced drag during forward flight.

Figure 3:
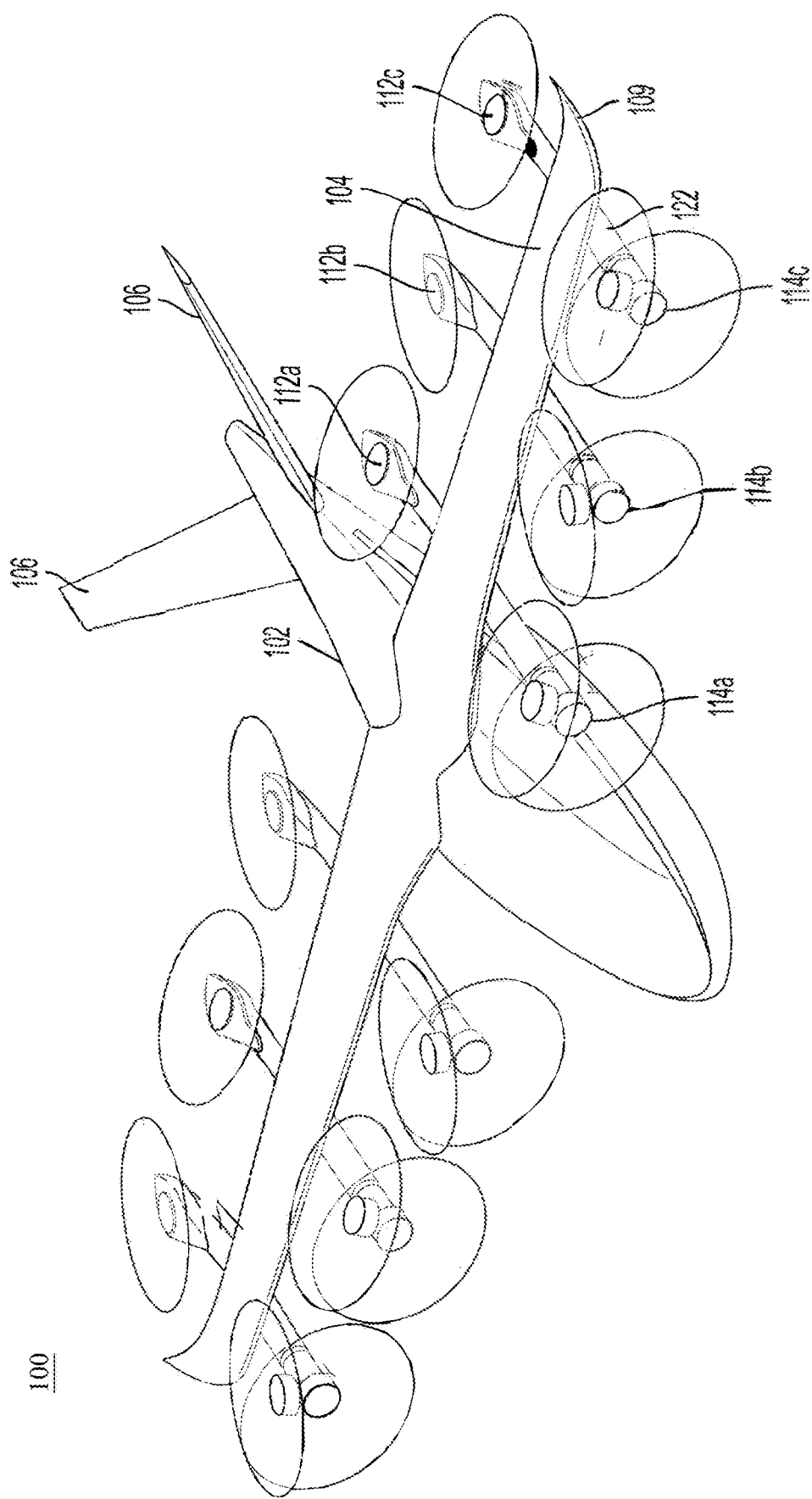
FIG. 3 is a schematic diagram illustrating an exemplary VTOL aircraft, consistent with embodiments of the present disclosure.

In some embodiments, rear stabilizers 106 include control surfaces, such as one or more rudders, one or more elevators, and/or one or more combined rudder-elevators. The wing(s) may have any suitable design. In some embodiments, the wings have a tapering leading edge 123, as shown for example, in the embodiment of FIG. 1. In some embodiments, the wings have a tapering trailing edge as shown in the embodiment of FIG. 3. In the embodiment of FIG. 3, the wings may have a substantially straight leading edge 127 in the central section of wings 104.

Aircraft 100 may include at least one door 110 for passenger entry and exit. In some embodiments, the door 110 may located beneath and forward of wings 104 as seen in FIG. 2.

In some embodiments, lift propellers 112 or tilt propellers 114 may canted relative to at least one other lift propeller 112 or tilt propeller 114. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the propeller portion onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Lift propellers 112 may be canted in any suitable manner and combination. In some embodiments, lift propellers 112 may be canted according to a corresponding tilt propeller. For example, as seen in FIG. 3, innermost lift propeller 112a may be canted by a same amount and in a same direction as innermost tilt propeller 114a. Similarly, lift propellers 112b and 112c may be canted similarly to the corresponding tilt propellers 114b and 114c, respectively. Any suitable combination of canting and/or non-canting of the lift propellers relative to one another and relative to the tilt propellers can be used to achieve desired performance characteristics.

Further discussion of VTOL aircraft may be found in US Patent Publication No. 2021/0362849, which is incorporated by reference in its entirety.

As discussed above, motors and related control components of VTOL aircraft may generate heat during operation. The heat must be dissipated to prevent degradation or damage to the motor, control components and other elements of the VTOL aircraft. For example, cooling may be achieved by directing an air flow over a heated component. The heated component may be, e.g., a motor or other heat-generating component, or it may be, e.g., a heat exchanger configured to receive heat from a heat-generating component by way of a liquid heat exchange medium. However, diverting a constant air flow from outside the VTOL may produce unwanted drag and other forces that may slow the aircraft. For example, a boom may be arranged with scoops or large apertures in order to collect sufficient air to meet maximum cooling requirements. Such scoops or large apertures may generate drag forces. Additionally, large apertures or other openings may create weak points in the VTOL structure and weaken the overall structural integrity. This may increase the risk of damage or failure, or impose requirements for reinforcing the structure elsewhere, which may lead to added weight in the VTOL aircraft.

Furthermore, some components may only generate high heat loads during their operational periods. For example, a lift propeller may only operate, and therefore only require large amounts of cooling, in a lift configuration during a lift phase. The lift configuration may be a period in which drag is not a major consideration for the lift propeller. However, during a cruise configuration, the situation may be reversed: drag may be a critical issue while cooling of the lift propeller may not.

Finally, air-cooled components may be exposed to dirt, debris and other contamination from the air flow. This contamination may degrade components, cause malfunctions and shorten their lifetimes. Therefore, it may be desirable to provide a lift motor cooling path and motor configuration that allows efficient cooling during lift, without incurring unacceptable drag penalties during cruise, and without contaminating or damaging sensitive components of the VTOL aircraft.

FIGS. 4A-C illustrate portions of a VTOL aircraft 400, consistent with embodiments of the present disclosure. VTOL aircraft 400 may be, e.g., similar to VTOL aircraft 100 of FIGS. 1-3. Elements in FIGS. 4A-C that are similar to those in FIGS. 1-3 may be labeled with corresponding numbers using 4 as the leading digit. For example, in some embodiments, boom 422 of FIG. 4A may be similar to boom 122 of FIGS. 1-3.

In FIG. 4A, two booms 422 are depicted on wing 404, the lower boom being shown in exploded view with a motor assembly 430 exposed. The upper boom 422 is shown as it would be seen in operation, with a fairing 425 covering its motor assembly. Motor assembly 430 may be coupled to boom 422 by a mount 434 (as seen in FIG. 4B). Each motor assembly 430 may be configured to drive its lift propeller 412 comprising blades 420 affixed to a hub 431.

Boom 422 is a structural component, in that it may significantly contribute to the structural integrity of VTOL aircraft 400 and provide structural support to motor assembly 430 and lift propeller 412. Stated another way, boom 422 is an elongated support structure for motor assembly 430, lift propeller 412, fairing 425, or other components of the VTOL aircraft 400. Fairing 425 is an aerodynamic component. For example, fairing 425 may be shaped to provide aerodynamic advantages, such as reduced drag, but will not significantly contribute to the structural integrity of VTOL aircraft 400 or provide structural support to motor assembly 430 or lift propeller 412.

Fairing 425 may further be configured to channel cooling air to motor assembly 430. For example, fairing 425 may comprise an air inlet 440 in its top side. Air inlet 440 may be an aperture positioned at an advantageous region on fairing 425 so as to receive a large of amount of cooling air from a downwash (i.e., a flow of air being forced down by the rotation of blades 420) from lift propeller 412 during operation. For example, inlet 440 may be placed under the path of blades 420 at a radial distance from hub 431 at which pressure or flow from the downwash is high. Furthermore, inlet 440 may have a slot shape elongated substantially along a longitudinal axis of boom 422 so as to span a range of radial distances from hub 431 and capture a larger volume of the downwash from lift propeller 412. Finally, as further discussed below with respect to FIG. 6D, air inlet 440 may be laterally offset from the longitudinal axis of boom 422 to place the inlet at a region of locally highest downwash pressure or mass flow.

Because inlet 440 is not required to face the forward direction of flight in order to collect sufficient airflow, it may have certain aerodynamic design advantages over conventional scoops or other apertures. For example, inlet 440 may be located on, e.g., a downward sloping surface of fairing 425 on an aft side of lift propeller 412. Further, a bump, lip or other aerodynamic feature may be formed on a forward side of air inlet 440 to reduce drag during a cruise configuration without interfering with the cooling function of air inlet 440 during a lift configuration.

In addition to the location and shape of air inlet 440, its size may be advantageously increased by virtue of air inlet 440 not being placed in a structural component of VTOL 400. For example, when large apertures or other openings are cut into a structural component, such as boom 422, they may cause concerns for the structural integrity of VTOL aircraft 400. This may not be a critical issue when cutting large openings into a non-structural surface, such as fairing 425, although other considerations (e.g., drag) may remain. Nevertheless, in some embodiments, boom 422 may comprise air inlet 440, or may comprise an inlet alternatively or in addition to inlet 440.

FIG. 4B illustrates an example closeup view of a motor assembly 430 of FIG. 4A, consistent with embodiments of the present disclosure. Motor assembly 430 may be mounted to, and supported by, boom 422 via mounting bracket 434. Motor assembly 430 may further be coupled to a hub 431 and blades 420 of a lift propeller 412 (as seen in FIG. 4A, not shown in FIG. 4B) via shaft 432. Motor assembly 430 may be configured to rotate the shaft 432 at variable speeds to generate vertical thrust at lift propeller 412 in a lift configuration during a lift phase of VTOL aircraft 400. Motor assembly 430 may be configured to position blades 420 of in a fixed low-drag cruise configuration during a cruise phase of VTOL aircraft 400 (for example, as seen in FIG. 4A).

Motor assembly 430 may comprise, e.g., a motor 435, gearbox 436, and inverter 437. Motor assembly 426 may further comprise an enclosure 426 around motor 435, gearbox 436, and inverter 437. For example, enclosure 426 may comprise a substantially form-fitting casing around the components 435-437 of motor assembly 430. Because motor 435, gearbox 436, and inverter 437 are encased within enclosure 426, the inner workings of said components are not displayed here. Enclosure 426 may prevent dust, debris or other pollutants contained in a cooling airflow from negatively impacting the components 435-437. Motor assembly 430 may further comprise heat transfer elements 433 and 438 placed outside the enclosure 426 to thermally couple the components 435-437 of motor assembly 430 to, e.g., a cooling airflow. For example, cooling fins 438 may be coupled to enclosure 426 to surround motor 435 at an upper portion of motor assembly 430. Further, a heat exchanger 433 may be coupled to enclosure 426 near inverter 437 at a lower portion of motor assembly 430. In some embodiments, portions of heat exchanger 433 or cooling fins 438 may extend inside enclosure 426 in a way that maintains a substantial seal against outside air.

It should be understood that the spatial relationships among different components of motor assembly 430 as shown in FIG. 4B are given by way of example, and need not always be arranged in this way. For example, in some embodiments, gearbox 436 may not be located below motor 435, or neither component may necessarily be located above or below the other. In general, the various components of motor assembly 430 may be arranged in a plurality of configurations as would be understood by those of ordinary skill in the art. Furthermore, motor assembly may comprise additional components, or may omit one or more components discussed herein.

Further, not all components need be arranged symmetrically. For example, motor 435 and gearbox 436 may be configured to share a same longitudinal axis. For instance, the longitudinal axis may correspond to an axis of rotation of their propeller (not shown in FIG. 4B). Meanwhile, inverter 437 may not share a longitudinal axis with motor 435 and gearbox 436. For example, inverter 437 may be arranged offset from other components of motor assembly 430, or placed on a side of motor assembly 430. In general, inverter 437 may be placed in any suitable arrangement within enclosure 426.

Additionally, motor assembly 430 may comprise redundancies to ensure proper operation in the event of failure of one or more components. For example, motor 435 may comprise a rotor surrounded by multiple redundant stators. The multiple stators may be configured to operate simultaneously in conjunction with one another, as well as on operating their own in the event of a failure. Similarly, inverter 437 may comprise multiple stages. In some embodiments, inverter 437 may comprise a dual stage inverter, or may comprise more than two stages.

Heat exchanger 433 may be configured to receive a circulating heat exchange medium from the interior of motor assembly 430. For example, the heat exchange medium may comprise oil, and the oil may be used to both lubricate and cool the components of motor assembly 430. The oil may circulate through a lubricating heat-exchange flow path that includes one or more components of motor assembly 430, such as motor 435, gearbox 436, inverter 437, and heat exchanger 433. The lubricating heat-exchange flow path may be advantageously minimized by locating heat exchanger 433 adjacent to enclosure 426, thereby minimizing the volume (and weight) of material required to achieve the cooling and lubricating functions. Further, the lubricating heat-exchange flow path may reduce the need for hoses, connections and other elements that may add complexity and weight, and increase the risk of failure. Motor assembly 430 may thus comprise a substantially sealed, hybrid-cooled system configured to target multiple heat-generating portions of motor assembly 430 with one or more cooling airflow paths, as further described below.

FIG. 4C illustrates an example closeup view of an enclosure 426 of motor assembly 430 of FIG. 4A or 4B, consistent with embodiments of the present disclosure. Enclosure 426 may comprise a motor enclosure 427, dividing plate 428, and inverter enclosure or controller enclosure 429.

Motor enclosure 427 may surround and seal upper components of motor assembly 430, such as motor 435 and gearbox 436. A coolant, such as oil, may circulate through motor enclosure 427 to lubricate and cool the components of motor 435 and gearbox 436. A lower face of motor enclosure 427 may be sealed by dividing plate 428. For example, dividing plate 428 may comprise an end bell plate that serves to close off motor enclosure 427.

Inverter enclosure 429 may surround and seal lower components of motor assembly 430, such as inverter 437. Inverter 437 may comprise, e.g., electronic circuit boards and other control components configured to control the operation of motor assembly 430. Therefore, inverter may comprise a lift propeller controller and inverter enclosure 429 may alternatively be referred to as a controller enclosure 429. Controller enclosure 429 may be isolated from the oil or other coolant of motor enclosure by dividing plate 428. For example, dividing plate 428 may comprise a thermal plate that serves to close off controller enclosure 429 and thermally couple it to the oil or other coolant.

Dividing plate 428 may comprise one or more plates sandwiched together and arranged between motor enclosure 427 and controller enclosure 429. For example, in some embodiments, dividing plate 428 may comprise an end bell and thermal plate as discussed above, sandwiched together between the motor and controller enclosures 427 and 429. Dividing plate 428 may isolate the interior spaces of motor and controller enclosures 427 and 429 from each other as well as from the external environment outside of enclosure 426. In some embodiments, one or more of the sandwiched plates of dividing plate 428 may comprise grooves, bores, or other conduits configured to distribute the oil or other coolant in a planar direction of dividing plate 428.

In some embodiments, dividing plate 428 may comprise an integral mounting bracket for supporting heat exchanger 433. Heat exchanger 433 may comprise, e.g., a folded fin or other type of heat exchanger. The oil or other coolant which has been heated by the motor 435, gearbox 436, or inverter 437, may be circulated through the fins of heat exchanger 433 by an internal conduit of heat exchanger 433. An inlet and outlet for the internal conduit may be coupled to an outlet and inlet, respectively, of the bores or grooves of dividing plate 428. In this way, heated oil (or other coolant) may carry heat from enclosure 426 to the fins of heat exchanger 433 where the heat may be passed to a cooling airflow that travels through the fins. Therefore the entire motor assembly may be efficiently cooled without exposing sensitive components to the external environment.

Motor enclosure 427, dividing plate 428, and inverter enclosure 429 may be formed of, e.g., a lightweight and rigid material having high thermal conductivity. For example, the material may comprise metals such as aluminum or copper, ceramics such as silicon carbide, or another suitable material.

FIGS. 5A-N provide schematic illustrations of example oil and airflow paths in a motor assembly and surrounding areas of a VTOL aircraft, consistent with embodiments of the present disclosure. The VTOL aircraft may be similar to, e.g., VTOL aircraft 100 of FIG. 1-3 or VTOL aircraft 400 of FIGS. 4A-C. Elements in FIGS. 5A-N that are similar to those in FIGS. 1-4C may be labeled with corresponding numbers, using 5 as the leading digit and ending with the corresponding figure letter. For example, in some embodiments, fairing 525a of FIG. 5A may be similar to fairing 425 of FIG. 4A or fairing 525b of FIG. 5B. The solid arrow lines in FIGS. 5A-N may represent oil (or other heat exchange medium) flow paths, while the dashed arrow lines may represent cooling airflow paths.

FIG. 5A schematically depicts a motor assembly 530a and surrounding elements of a VTOL aircraft, consistent with embodiments of the present disclosure. Motor assembly 530a may comprise components such as motor 535a, gearbox 536a, and inverter 537a housed within enclosure 526a. Enclosure 526a may comprise motor enclosure 527a, dividing plate 528a, and controller enclosure 529a. Motor enclosure 527a may surround and seal components such as motor 535a and gearbox 536a. Controller enclosure 529a may surround and seal inverter 537a. Motor assembly 530a may further comprise heat exchanger 533a thermally coupled to the components 535a-537a by way of a lubricating heat-exchange oil flow path (indicated by solid lines). In some embodiments, heat exchanger 433 may be supported by a mounting bracket or other extension of dividing plate 528a. Dividing plate 528a may extend beyond the motor and controller enclosures 527a/529a so that dividing plate 428a may both support heat exchanger 533a and seal the motor and controller enclosures 527a and 529a. Dividing plate 528a may further comprise bores, grooves or other conduits to circulate oil (or other coolant) from motor enclosure 527a into heat exchanger 533a. Middle 528a may further thermally couple controller enclosure 529a to the oil by thermal conduction. Thus, the lubricating heat-exchange oil flow path may lubricate the components 535a-537a and/or absorb heat generated by the components. Heat absorbed by the oil may be carried to heat exchanger 533a where it may be transferred to incoming air (indicated by dashed lines). For example, the air may pass through fins or other pathways in heat exchanger 533a. The fins or other pathways may be configured to maximize the surface contact area between the heat exchanger and the air flow while maintaining acceptable limits of air pressure drop across the heat exchanger. Air flow may enter an interior chamber by inlet 540a in the surface of fairing 525a. The interior chamber may be formed by fairing 525a and may enclose motor assembly 530a in cooperation with, e.g., the end of a boom to which fairing 525a is attached (not shown). The airflow may be forced into the inlet as, e.g., downwash from propeller blades (not shown) above the inlet 540a. Air may exit the heat exchanger 533a and leave the chamber, for example by one or more air outlets (not shown) without entering or passing through enclosure 526a.

The lubricating heat-exchange oil flow path is illustrated with a high level of generality as a simple loop. However, it should be understood that the oil flow path may comprise branches, sub-loops or other segmented paths. In general, the oil may be circulated in any way that effectively lubricates and cools various components of the motor assembly.

FIG. 5B schematically depicts a motor assembly 530b and surrounding elements of a VTOL aircraft, consistent with embodiments of the present disclosure. Elements corresponding to those in FIG. 5A may have like numerals, and their description may be omitted here. In FIG. 5B, motor assembly 530b may further comprise an additional heat transfer element 538b coupled to enclosure 526b. For example, heat transfer element 538b may comprise cooling fins attached to the exterior of motor enclosure 527b similar to the configuration illustrated in FIG. 4B. Airflow from inlet 540b may be split into a bifurcated airflow path, with a first airflow path passing through heat transfer element 538b and a second airflow path passing through heat exchanger 533b. The first airflow path may exit through an outlet (not shown) without passing through heat exchanger 533a. As seen in FIG. 5B, the first airflow path is shown passing behind heat exchanger 533b. However, this is merely a schematic illustration to demonstrate that the two airflow paths are not colinear. The second airflow path may exit through the same outlet or a different outlet without passing through heat transfer element 538a. The bifurcated flow path may enable the cooling airflow to be targeted at the sections with a highest heat load in motor assembly 530b. Furthermore, providing distinct flow paths may allow each section of motor assembly 530b to be cooled regardless of the heat load being applied to a different flow path of a different section. For example, when motor 535b is very hot and transferring a large amount of heat to the first flow path by heat transfer element 538b, heat exchanger 533b may continue to receive relatively low-temperature airflow from the second flow path because that airflow has not encountered heat transfer element 538b.

FIG. 5C schematically depicts a motor assembly 530c and surrounding elements of a VTOL aircraft, consistent with embodiments of the present disclosure. Elements corresponding to those in FIGS. 5A-B may have like numerals, and their description may be omitted here. In FIG. 5C, the bifurcated flow path may be rejoined before entering heat exchanger 533c. This may have the advantage of providing a larger airflow to heat exchanger 533c at the expense of risking heat transfer between heat transfer element 538c and heat exchanger 533c. In some embodiments, various parameters (e.g., the expected mass flow and temperature of incoming air, the expected heat loads from heat transfer element 538c and heat exchanger 533c, etc.) may render such risks acceptable.

FIG. 5D schematically depicts a motor assembly 530d and surrounding elements of a VTOL aircraft, consistent with embodiments of the present disclosure. Elements corresponding to those in FIGS. 5A-C may have like numerals, and their description may be omitted here. FIG. 5D depicts a single airflow path through both heat transfer element 533d and heat exchanger 533d. This arrangement may provide the full flow of cooling air to both elements 533d and 538d, and may offer a simpler interior structure to the chamber within fairing 525d.

FIG. 5E schematically depicts a motor assembly 530e and surrounding elements of a VTOL aircraft, consistent with embodiments of the present disclosure. Elements corresponding to those in FIGS. 5A-D may have like numerals, and their description may be omitted here. FIG. 5E depicts a bifurcated airflow path in which a first airflow path may exit through a first inlet on a first side of the chamber, and a second airflow path may exit through a second inlet on a second side of the chamber. For example, as discussed below, the first airflow path may pass through, e.g., cooling fins of heat transfer element 538e to carry away heat transferred from an upper portion of motor assembly 530e, such as from motor 535e. The first airflow path may then exit through, e.g., a top side of fairing 525e at an area of relatively lower pressure than a pressure value found at inlet

540e. Meanwhile, the second airflow path may pass through, e.g., heat exchanger 533e to carry away heat transferred from a lower portion of motor assembly 530e, such as from inverter 537e, or from all components 535e-537e via the heated oil. The second airflow path may then exit through, e.g., a bottom side of fairing 525e. The arrangement of FIG. 5E may provide an improved thermal separation between the two flow paths, and may provide shorter runs within each airflow path so that heated air exits the chamber more quickly. Furthermore, the arrangement of FIG. 5E may allow the system to take advantage of multiple low-pressure exit regions to improve overall airflow through the chamber.

FIG. 5F schematically depicts a motor assembly 530f and surrounding elements of a VTOL aircraft, consistent with embodiments of the present disclosure. Elements corresponding to those in FIGS. 5A-E may have like numerals, and their description may be omitted here. FIG. 5F depicts a general case in which a controller 537f for a motor assembly 530f is located in a sealed enclosure 526f and thermally coupled to an external heat exchanger 533f. In some embodiments, enclosure 526f may house other elements as well, such as other components of motor assembly 530f. Heat from controller 537f may be transferred to oil or other coolant circulating within enclosure 526f and subsequently transferred to a cooling airflow by heat exchanger 533f.

FIG. 5G schematically depicts a motor assembly 530g and surrounding elements of a VTOL aircraft, consistent with embodiments of the present disclosure. Elements corresponding to those in FIGS. 5A-F may have like numerals, and their description may be omitted here. FIG. 5G depicts an embodiment similar to that of FIG. 5A, where a cooling airflow path is constrained within a channel 545g. For example, channel 545g may comprise a baffle or duct configured to define a channel to enclose an airflow cooling path between inlet 540g and an inlet side of heat exchanger 533g. Further, channel 545g may continue from an outlet side of heat exchanger 533 to an air outlet (not shown) in fairing 525g. In some embodiments, channel 545g may partially or completely enclose the cooling airflow path, and further isolate the downwash in the airflow path from the encased components of the motor assembly inside enclosure 526g. The arrangement of FIG. 5G may advantageously provide an improved flow rate and reduced internal cavity pressure losses, as further discussed below with respect to FIG. 6E.

FIGS. 5H-N schematically depict further configurations of a motor assembly and surrounding elements of a VTOL aircraft, consistent with embodiments of the present disclosure. Elements corresponding to those in FIGS. 5A-G may have like numerals, and their description may be omitted here. The arrangements of FIGS. 5H-N substantially correspond to the arrangements of FIGS. 5A-G, respectively. However, in each of FIGS. 5H-N, inlet 540 may be located within a boom 522 rather than a fairing 525. Thus, FIG. 5H substantially corresponds to FIG. 5A, wherein inlet 540h is located in boom 522h rather than in a fairing. FIG. 5I substantially corresponds to FIG. 5B, wherein inlet 540i is located in boom 522i rather than in a fairing. FIG. 5J substantially corresponds to FIG. 5C, wherein inlet 540j is located in boom 522j rather than in a fairing. FIG. 5K substantially corresponds to FIG. 5D, wherein inlet 540k is located in boom 522k rather than in a fairing. FIG. 5L substantially corresponds to FIG. 5E, wherein inlet 540l is located in boom 522l rather than in a fairing. FIG. 5M substantially corresponds to FIG. 5F, wherein inlet 540m is located in boom 522m rather than in a fairing. FIG. 5N substantially corresponds to FIG. 5G, wherein inlet 540n is located in boom 522n rather than in a fairing.

In some embodiments, the surface of booms 522h-n in FIGS. 5H-N may take the place of a fairing 525, and inlet 540h-n may be located in substantially the same place as it would otherwise be. For example, an aft contour area including inlets 540h-n, which may be a fairing in some embodiments (such as, e.g., fairing 425 as seen in FIG. 4A), may instead form part of the boom, and may be part of a structural surface that contributes to the structural integrity of the VTOL aircraft or supports a motor assembly 530. Alternatively, the inlets 540h-n may be placed in a different location away from the fairing. For example, the arrangements of FIGS. 5H-N may still comprise fairings on the aft contour area, but inlets 540h-n may be placed in other locations on the surfaces of booms 522h-n. In some embodiments, the fairing may occupy more or less of the total surface contour formed by the boom and fairing combination, and inlets/outlets may be formed in the fairing, boom, or both. In some embodiments, an inlet or outlet may span the boundary between a boom and fairing.

FIGS. 6A-E illustrate example airflow path arrangements in portions of VTOL aircraft 600a-e, consistent with embodiments of the present disclosure. VTOL aircraft 600a-e may be, e.g., similar to any of VTOL aircraft 100, 400 or 500 of FIGS. 1-5N, respectively. Elements in FIGS. 6A-E that are similar to those in FIGS. 1-5N may be labeled with corresponding numbers using 6 as the leading digit. For example, in some embodiments, inlet 640 of FIG. 6A may be similar to inlet 440 of FIG. 4A.

Figure 6A:
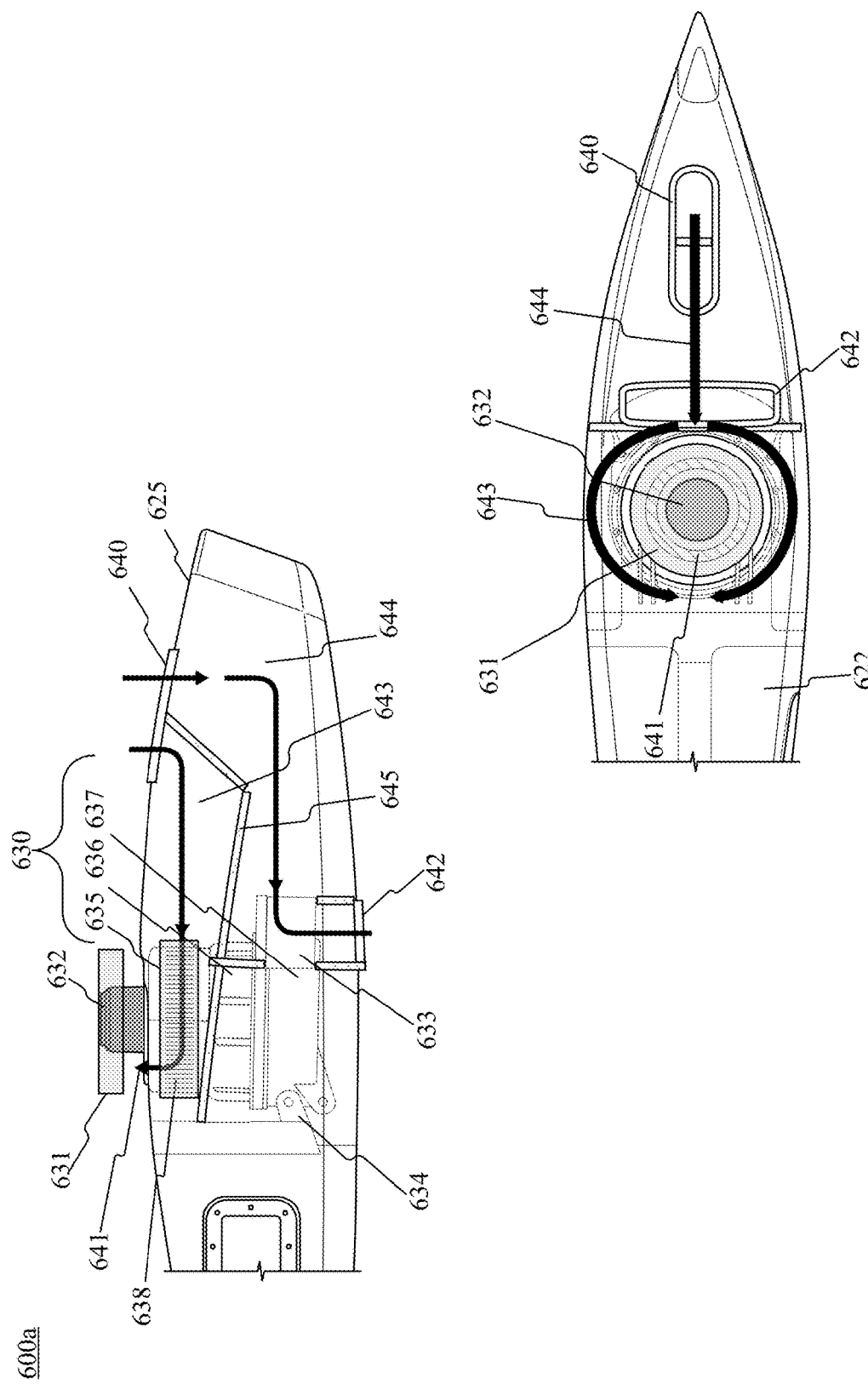

FIG. 6A illustrates an example bifurcated airflow path arrangement in portions of a VTOL aircraft 600a, consistent with embodiments of the present disclosure. Airflow from, e.g., the downwash of a lift propeller blade (not shown) may enter fairing 625 through inlet 640 as indicated by arrows. Inlet 640 may be located at a region of relatively high pressure due to the downwash. Baffle 645 may split the airflow into upper flow path 643 and lower flow path 644. Alternatively, separate inlets may be provided for each of the motor and lower flow paths.

Air in lower flow path 644 may be guided by baffle 645 through heat exchanger 633. Heat exchanger 633 may receive heat from components of a motor assembly 630 such as motor 635, gearbox 636, or inverter 637 by way of, e.g., an oil flow path as discussed with respect to FIGS. 5A-N. Cooling air in the lower flow path 644 may absorb heat from heat exchanger 633 and exit fairing 625 at lower outlet 642. In this way, a source of cool air may be constantly supplied to a targeted heat load during lift phases, when heat generation is at a maximum. Meanwhile, sensitive components within the motor assembly 630 may be protected from impurities within the airflow by an enclosure.

As seen from above in the lower drawing of FIG. 6A, inlet 640 and outlet 642 may have different shapes and orientations. For example, inlet 641 may be elongated substantially parallel to a longitudinal axis of boom 622 to, e.g., span a range of radial distances from hub 631 and capture a large volume of downwash from the lift propeller blades. In some embodiments, inlet 640 may comprise an asymmetry. For example, inlet 640 may be offset from the longitudinal axis, may be elongated substantially at an angle to the longitudinal axis, or may comprise a shape that is not symmetrical with respect to the longitudinal axis. The asymmetry may depend on the unique downwash distribution that is expected for the particular boom to which inlet 640 belongs. For example, lift propellers may be configured to rotate in one of two rotational directions, creating an asymmetry in the downwash distribution on an upper surface of fairing 625. Furthermore, lift propellers may be canted at different angles, as seen in FIG. 3. Therefore, the location, shape and orientation of inlets 640 may be chosen to correspond to these asymmetries and their resulting expected downwash distributions.

In some embodiments, outlet 642 may be elongated substantially perpendicular to the longitudinal axis. Outlet 642 may be arranged so that heated air may easily escape from heat exchanger 633. For example, outlet 642 may be shaped and oriented to substantially match an exit path of heat exchanger 633. In some embodiments, outlet 642 may not correspond exactly to the shape or size of an exit side of heat exchanger 633.

In some embodiments as discussed below with respect to FIG. 6E, baffle 645 may define a channel configured to direct air between the differently sized or differently oriented inlets and outlets. For example, rather than forming an open chamber in lower path 644, baffle 645 may define a channel that matches the right-hand portion of inlet 640 (as seen from above in FIG. 6A) at the location of inlet 640. The channel may conform to a shape of an inlet side of heat exchanger 633 at the location of the inlet side of heat exchanger 633. The channel may continue from an outlet side of heat exchanger 633 and conform to the shape of the outlet side at that location. Finally, the channel may extend to outlet 642, and may substantially match the shape and orientation of outlet 642 at that location.

Air in upper flow path 643 may be guided by baffle 645 through a heat transfer element 638, such as cooling fins. The cooling fins 638 may transfer heat to the air from an upper portion of a motor assembly such as, e.g., motor 635. As seen in the lower drawing in FIG. 6A, air in the upper flow path 643 may be channeled to encircle cooling fins 638 and motor 635 to optimize heat transfer. The heated air may then exit fairing 625 by an upper outlet 641.

Upper outlet 641 surround shaft 632 and may exit fairing 625 at a region of relatively low pressure compared to inlet 640. Downwash from propeller blades above the fairing may vary with radial distance from hub 631, with downward pressure the central region of upper outlet 641 being significantly lower than at the region of inlet 640. This may be especially true at a region directly beneath hub 631, which may not generate any direct downwash from rotation. Thus, in some embodiments, outlet 641 may be located entirely or partly beneath hub 631. Further, using an upper outlet may allow the flow path to take advantage of convection created by the heated air at cooling fins 638 to increase the upward flow at upper outlet 641. In this way, two flow paths may be kept entirely separate from inlet to outlet. Flow path arrangements according to FIG. 6A may allow for multiple low pressure regions to be fully utilized in a lift configuration during a lift phase.

Additionally, the contour of inlets and outlets may be optimized for reduced drag during a cruise phase without significant penalty on airflow during a lift phase. For example, outlet 641 may be configured to surround shaft 632 or hub 631 with, e.g., a skewed elliptical shape. Outlet 641 may have a larger opening on the aft side of shaft 632 than on the forward side, or may comprise a lip or other aerodynamic feature on its forward side to minimize cruise drag while allowing heated air to exit easily during a lift phase.

Figure 6B:
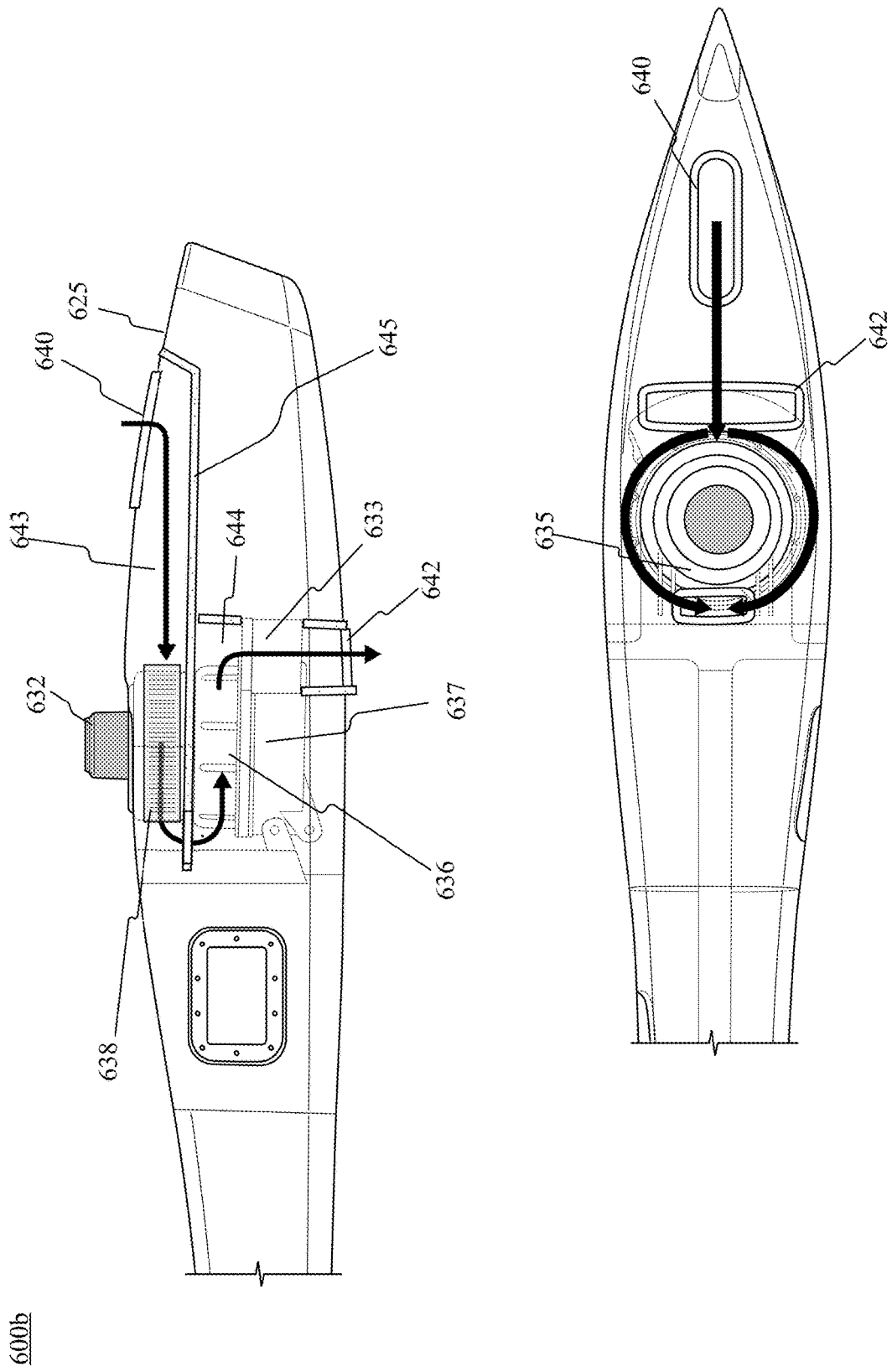

FIG. 6B illustrates an example single flow path in a VTOL aircraft 600b, consistent with embodiments of the present disclosure. Elements corresponding to those in FIG. 6A may have like numerals, and their description may be omitted here. In FIG. 6B, the full airflow from inlet 640 may be channeled through multiple heat load sources in motor assembly 630. Thus, the airflow may traverse upper flow path 643 and lower flow path 644 without bifurcation. For example, as seen in the upper and lower drawings of FIG. 6B, baffle 645 may extend beyond the aft side of inlet 640 so that the entire inlet is undivided. This arrangement may beneficially provide more cooling airflow to each component. Further, eliminating upper outlet 641 may allow for greater channeling of the airflow through fairing 625 to heat exchanger 633. In some embodiments, outlet 641 may instead be configured as a secondary inlet. For example, as discussed below with respect to FIGS. 8-9B, a lift propeller may be provided with auxiliary features configured to direct additional cooling air into a secondary inlet around shaft 631.

Figure 6C:
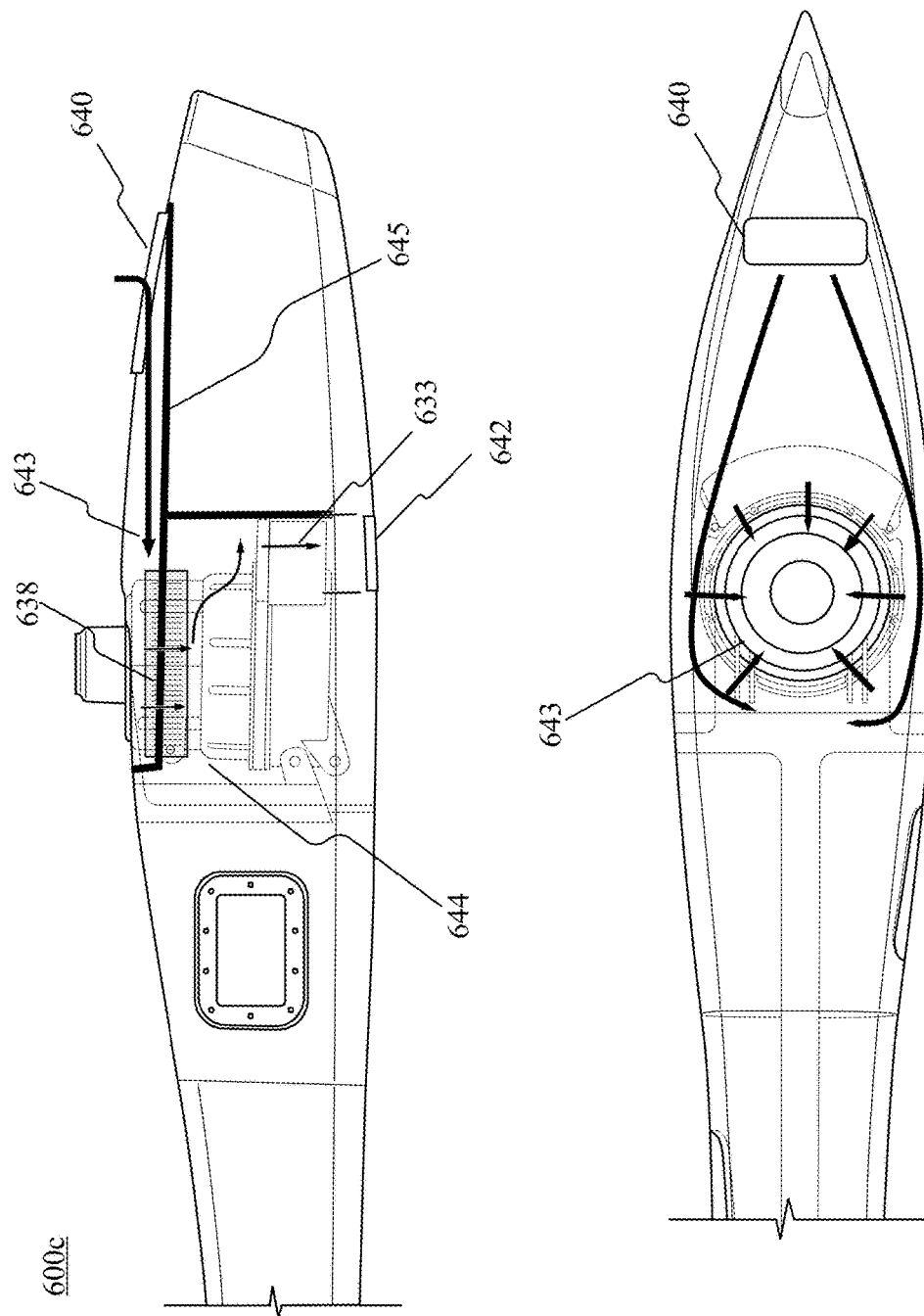

FIG. 6C illustrates a further variation of an example flow path arrangement similar to FIG. 6B in a VTOL aircraft 600c, consistent with embodiments of the present disclosure. Elements corresponding to those above may have like numerals, and their description may be omitted here. In FIG. 6C, an upper flow path may be restricted to direct airflow to an upper portion of cooling fins 638. Baffle 645 may be configured with a manifold or other apertures to direct air into cooling fins 638. For example, as illustrated by the radially inward arrows in the lower drawing of FIG. 6C, airflow from upper path 643 may encircle cooling fins 638 and flow downward along the cooling fins into lower flow path 644. Airflow may then pass around an exterior of the motor assembly as it proceeds to heat exchanger 633 and lower outlet 642. In this way, cooling air may come into close and sustained contact with heat generating regions of motor assembly 630 for efficient heat transfer.

Figure 6D:
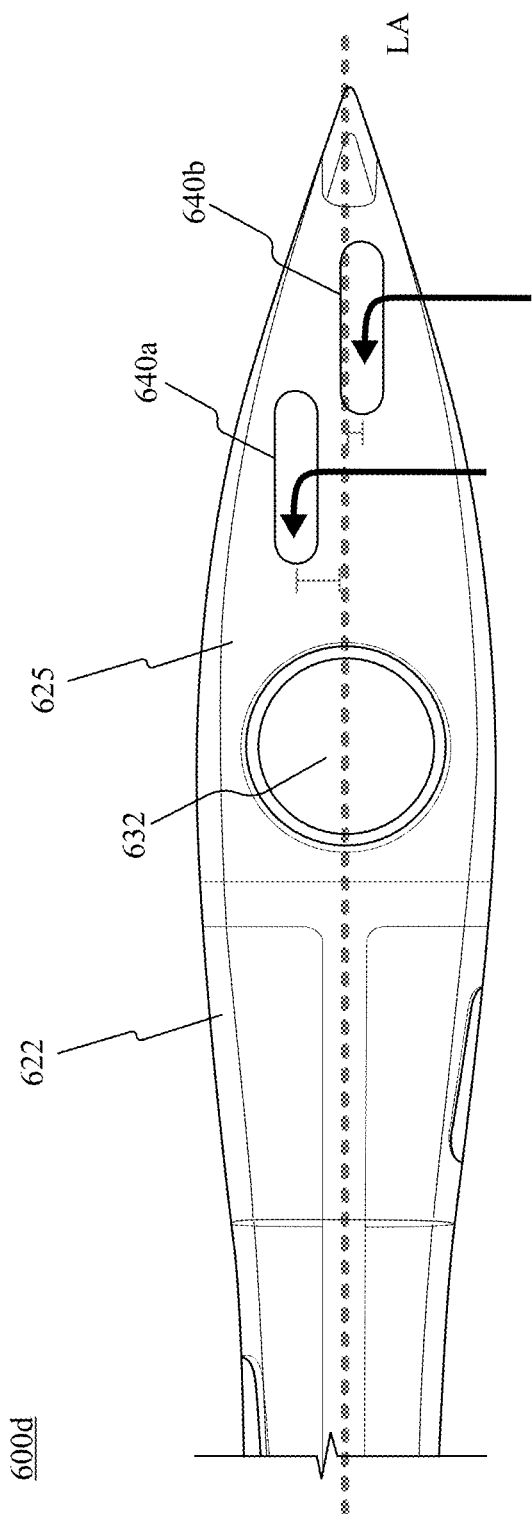

FIG. 6D illustrates an example inlet arrangement in portions of a VTOL aircraft 600d, consistent with embodiments of the present disclosure. Inlet 640 may comprise a plurality of inlets 640a and 640b. The inlets 640a-b may correspond to the same or different flow paths. For example, in some embodiments, first inlet 640a may direct airflow to a first flow path, and second inlet 640b may direct air to a second flow path. In some embodiments, both inlets 640a and 640b may direct air to one or more flow paths. In some embodiments, there may be more than two inlets.

The plurality of inlets 640a-b may be arranged to correspond to a downwash distribution of the particular boom 622 to which the inlets 640a-b belong. For example, as indicated by arrows, downwash from propellers (not shown) above boom 622 and fairing 625 may have a swirl component in view of their rotational direction. This swirl component may result in a downwash distribution that is more favorably collected by an asymmetrical arrangement of one or more inlets 640a-b with respect to a longitudinal axis LA of boom 622. For example, inlets 640a-b may be offset from longitudinal axis LA so as to be located at areas of greatest downwash, or to utilize the swirl component. The inlets 640a-b may be offset to different sides of longitudinal axis LA. For example, the downwash distribution may have a complex or curved shape along the upper surface of fairing 625. First inlet 640a may be located at first radial distance from a hub 632.

The swirl component may further be utilized, e.g., to generate a desired flow direction within fairing 625 or to actuate louver doors as discussed below. The offset or other asymmetry may vary depending on the features of each boom 622, such as the direction of blade rotation or the cant angle. For example, a first boom may comprise a first lift propeller configured to rotate in a first direction. One or more inlets on the first boom may be offset from its longitudinal axis in a first direction. A second boom may comprise a second lift propeller configured to rotate in a second direction. One or more inlets on the second boom may be offset from its longitudinal axis in a second direction.

FIG. 6E illustrates an example single flow path in a VTOL aircraft 600e, consistent with embodiments of the present disclosure. Elements corresponding to those in FIG. 6A-D may have like numerals, and their description may be omitted here. In FIG. 6E, baffle 645 may define a channel to direct airflow to heat exchanger 633. For example, baffle 645 may comprise a funnel-shaped channel. The channel may have curved interior surfaces or may have flat sides. In some embodiments, the shape of the channel may generally conform to the shapes of the various inlets and outlets to which it connects. For example, the channel formed by baffle 645 may substantially fit a contour of inlet 640 at the location of inlet 640, and a contour of outlet 642 at the location of outlet 642. Furthermore, the channel formed by baffle 645 may substantially fit the contours of the inlet and outlet sides of heat exchanger 633 at the inlet and outlet locations of heat exchanger 633. Thus, a large airflow may be captured by arranging inlet 640 in any desired size, shape and orientation. Regardless of the chosen size, shape and orientation, the airflow may be funneled efficiently into the fins of heat exchanger 633 with little turbulence, and minimal internal cavity pressure losses. Configuring the baffle 645 as a form-fitting channel may therefore allow greater design freedom to other elements of the cooling path.

In some embodiments, the arrangement of FIG. 6E may illustrate one component of a bifurcated flow path. For example, FIG. 6E may illustrate an example of the lower flow path 644 seen in FIG. 6A as discussed above.

FIGS. 7A-B illustrate example arrangements in portions of VTOL aircraft 700a-b, consistent with embodiments of the present disclosure. VTOL aircraft 700a-b may be, e.g., similar to any of VTOL aircraft 100, 400, 500 or 600 of FIGS. 1-6E, respectively. Elements in FIGS. 7A-B that are similar to those in FIGS. 1-6E may be labeled with corresponding numbers using 7 as the leading digit. For example, in some embodiments, inlet 740 of FIG. 7A may be similar to inlet 440 of FIG. 4A.

In FIG. 7A, inlets 740 may comprise doors 746 configured to optimize aerodynamic needs between lift and cruise configurations. For example, doors 746 may be configured to open during a lift configuration to allow air to enter inlets 740, and close during a cruise configuration to reduce drag. Doors 746 may comprise a lip or other feature that causes doors 746 to be forced open by a swirl component of downwash from blades 720. Hinges 747 may be arranged substantially perpendicular to the swirl component to enable the opening and closing. Doors 746 may comprise springs or other biasing mechanisms to keep them tightly closed during a cruise configuration when blades 720 are shut off. Doors 746 may be closed by gravity or forced into a closed position by air during cruise. Doors 746 may also be actuated to open and closed positions by active control. Alternatively, doors 746 may be fixed in place at an angle that captures sufficient airflow from a swirl component of the downwash. The fixed doors may be configured to reduce drag from what it would otherwise be with fully exposed apertures at inlets 740. For example, doors 746 may have a wider angled opening at an aft side than a forward side, or may comprise other contours designed to reduce drag. For example, the openings created by doors 746 may be angled to at least partially face an aft side of fairing 725, so that air is not blown into fairing 725 during forward motion in cruise.

FIG. 7B illustrates a further variation of an example door 746 arrangement in a VTOL aircraft 700b, similar to FIG. 7A in a VTOL aircraft 700a, consistent with embodiments of the present disclosure. Elements corresponding to those above may have like numerals, and their description may be omitted here. In FIG. 7B, door 746 may be forced inward by downwash during a lift phase. Door 746 may comprise a majority of the upper surface of fairing 725 so that flow paths receive a large volume of airflow when in the lift configuration. For example, in a cross sectional direction of fairing 725 perpendicular to a longitudinal axis of boom 722, a width of door 746 may occupy 50%, 75%, 85% or 90% of the width of the upper surface of fairing 725. Door 746 may then be biased or actuated to a closed position during cruise to reduce drag. Hinge 747 may be located, e.g., at an aft end of door 746 as shown, or may be located along one side as seen in FIG. 7A.

FIG. 8 illustrates an example auxiliary feature on a lift propeller in portions of VTOL aircraft 800, consistent with embodiments of the present disclosure. VTOL aircraft 800 may be, e.g., similar to any of VTOL aircraft 100, 400, 500, 600 or 700 of FIGS. 1-7B, respectively. Elements in FIG. 8 that are similar to those in FIGS. 1-7B may be labeled with corresponding numbers using 8 as the leading digit. For example, in some embodiments, blades 820 of FIG. 8 may be similar to blades 420 of FIG. 4A.

In FIG. 8, blade 820 may comprise interior channel 850 to direct additional cooling air into a secondary inlet. For example, as discussed above with respect to FIG. 6B, in some embodiments the secondary inlet may be located around a hub 831 or shaft 832. The rotation of blades 820 may force air into a blade inlet 851 through blade channel 850 to blade outlet 852, as indicated by dashed arrows. Blade outlet may be located in a hub 831 as shown, or may be formed elsewhere, such as at a root of blade 820 near hub 831. Alternatively, one or more blade outlets 852 may be arranged, e.g., midway through blade 820 to be aligned with another inlet, such as inlets 640 of FIGS. 6A-E.

FIGS. 9A-B illustrate a further example auxiliary feature on a lift propeller in portions of VTOL aircraft 900, consistent with embodiments of the present disclosure. VTOL aircraft 900 may be, e.g., similar to any of VTOL aircraft 100, 400, 500, 600, 700 or 800 of FIGS. 1-8, respectively. Elements in FIGS. 9A-B that are similar to those in FIGS. 1-8 may be labeled with corresponding numbers using 9 as the leading digit. For example, in some embodiments, blades 920 of FIG. 9A may be similar to blades 420 of FIG. 4A.

FIG. 9A illustrates a plurality of integrated cooling blades 953, consistent with embodiments of the present disclosure. Cooling blades 953 may be located, e.g., on a spinner or hub 932 below lift propeller blades 920. Cooling blades may direct a flow of cooling air through a secondary inlet to, e.g., a stator of a motor assembly. For example, as discussed above with respect to FIG. 6B, in some embodiments the secondary inlet may be located around a hub 831 or shaft 832. The flow rate of cooling air may be proportional to the rotational speed of the lift propeller, and therefore to the rate of heat generation in the lift propeller motor assembly. This results in a cooling system design that passively increases the flow rate as needed when the lift propeller is generating more heat. The cooling blade configuration may be added without requiring additional failure-prone components, such as a dedicated motor, wiring, or controls.

FIG. 9B illustrates a further configuration for a plurality of integrated cooling blades 953, consistent with embodiments of the present disclosure. In FIG. 9B, cooling blades 953 may be arranged around a shaft 931 and be surrounded by a fan cowling 954. Fan cowling 954 may be configured to channel a cooling air flow through cooling blades 953 for improved the airflow to the motor assembly.

Some embodiments of the present disclosure, such as, e.g., FIGS. 6A-7B, have been described with respect to a inlets being located on a fairing. However, embodiments of the present disclosure are not limited to this. As discussed at FIGS. 5A-N, embodiments of the present disclosure may alternatively locate inlets or outlets on a boom instead of a fairing, for reasons discussed above. Similarly, elements illustrated in some figures as a fairing may alternatively be formed as part of a boom.

The embodiments may further be described using the following clauses:

Clause Set A

1. A lift apparatus of a vertical takeoff and landing (VTOL) craft, comprising:
   a lift propeller;
   a motor assembly coupled to the lift propeller;
   a boom, the boom supporting the motor assembly;
   a fairing coupled to the boom and surrounding the motor assembly;
   an air inlet located at a top side of the fairing, the air inlet configured to receive downwash of the lift propeller during a lift phase of the VTOL craft;
   a cooling path configured to direct the downwash to the motor assembly; and
   an air outlet, the air outlet configured to exhaust the downwash from the cooling path.
2. The lift apparatus of clause A1, wherein a center of the air inlet is aligned with a longitudinal axis of the boom.
3. The lift apparatus of clause A1, wherein a center of the air inlet is offset from a longitudinal axis of the boom.
4. The lift apparatus of clause A3, wherein the offset of the air inlet corresponds to a region, in a direction perpendicular to the longitudinal axis of the boom, of highest downwash pressure from the lift propeller.
5. The lift apparatus of clause A1, wherein the air inlet comprises a plurality of air inlets.
6. The lift apparatus of clause A5, wherein:
   the plurality of air inlets are offset from each other in a direction of a longitudinal axis of the boom;
   the plurality of air inlets are offset from each other in a direction perpendicular to the longitudinal axis of the boom; and
   for each of the plurality of air inlets, the offset in the direction perpendicular to the longitudinal axis of the boom corresponds to a region, in the perpendicular direction, of highest downwash pressure from the lift propeller.
7. The lift apparatus of clause A1, wherein in a cross-section of the fairing, a width of the air inlet is more than 50% of a width of the fairing.
8. The lift apparatus of clause A7, wherein in the cross-section of the fairing, the width of the air inlet is more than 75% of the width of the fairing.
9. The lift apparatus of clause A1, further comprising:
   a second lift propeller;
   a second motor assembly coupled to the second lift propeller;
   a second boom, the second boom supporting the second motor assembly;
   a second fairing coupled to the second boom and surrounding the second motor assembly;
   a second air inlet located at a top side of the second fairing, the second air inlet configured to receive second downwash of the second lift propeller during the lift phase of the VTOL craft;
   a second cooling path configured to direct the second downwash to the second motor assembly; and
   a second air outlet, the second air outlet configured to exhaust the second downwash from the second cooling path.
10. The lift apparatus of clause A9, wherein:
    the motor assembly is configured to rotate the lift propeller in a first rotational direction;
    the second motor assembly is configured to rotate the second propeller in a second rotational direction opposite the first rotational direction;
    a center of the air inlet is offset from a longitudinal axis of the boom in a first offset direction; and
    a center of the second air inlet is offset from a longitudinal axis of the second boom in a second offset direction opposite the first offset direction.
11. The lift apparatus of clause A1, wherein the air outlet is located in the fairing.
12. The lift apparatus of clause A1, wherein the air outlet is located in a bottom side of the fairing.
13. The lift apparatus of clause A12, wherein the air outlet is located under a heat exchanger of the motor assembly.
14. The lift apparatus of clause A1, wherein the air outlet is located in the top side of the fairing.
15. The lift apparatus of clause A13, further comprising a second air outlet located in a bottom side of the fairing.
16. The lift apparatus of clause A13, wherein the air outlet surrounds a shaft of the lift propeller.
17. The lift apparatus of clause A16, wherein the air outlet comprises an elliptical shape.
18. The lift apparatus of clause A14, wherein the air outlet is located under a hub of the lift propeller.
19. The lift apparatus of clause A18, wherein a segment of an outer boundary of the air outlet is located under a hub of the lift propeller.
20. The lift apparatus of clause A1, further comprising:
    a first downwash flow path directed to an upper portion of the motor assembly; and
    a second downwash flow path directed to a lower portion of the motor assembly.
21. The lift apparatus of clause A20, wherein
    the air inlet comprises a first air sub-inlet and a second air sub-inlet;
    the first air sub-inlet is configured to direct a first portion of the downwash to the first downwash flow path; and
    the second air sub-inlet is configured to direct a second portion of the downwash to the second downwash flow path.
22. The lift apparatus of clause A20, further comprising a baffle configured to bifurcate the downwash into the first downwash flow path and the second downwash flow path.
23. The lift apparatus of clause A1, wherein
    the motor assembly comprises a hybrid-cooled motor assembly having a first motor assembly portion and a second motor assembly portion;
    the first motor assembly portion is configured to be directly air-cooled by a first portion of the downwash in a first downwash flow path;
    the second motor assembly portion is configured to be indirectly air-cooled via a fluid heat exchange medium in a second portion of the downwash in a second downwash flow path.

24. The lift apparatus of clause A1, further comprising a manifold configured to distribute the downwash around the motor assembly.
25. The lift apparatus of clause A1, further comprising a door configured to:
    open during the lift phase of the VTOL craft to expose the air inlet to the downwash, and
    close during a cruise phase of the VTOL craft to cover the air inlet.
26. The lift apparatus of clause A25, further comprising a control actuator configured to actuate the door.
27. The lift apparatus of clause A25, further comprising a biasing mechanism configured to bias the door to a closed position.
28. The lift apparatus of clause A27, wherein a biasing force of the biasing mechanism is configured to be higher than an opposing force from air during the cruise phase of the VTOL craft and lower than an opposing force from air during the lift phase of the VTOL craft.
29. The lift apparatus of clause A25, wherein the door is configured to be opened by a swirl component of the downwash.
30. The lift apparatus of clause A25, wherein the door comprises a hinge in the fairing.
31. The lift apparatus of clause A1, wherein the motor assembly comprises a motor, a gearbox, and an inverter.
32. The lift apparatus of clause A31, wherein:
    the motor and gearbox share a same longitudinal axis; and
    an axis of the inverter is offset from the longitudinal axis of the motor and gearbox.
33. The lift apparatus of clause A31, wherein:
    the motor assembly comprises redundant components.
34 The lift apparatus of clause A33, wherein the redundant components comprise at least one of a redundant stator of the motor, and a redundant inverter stage of the inverter.
35. A vertical takeoff and landing (VTOL) craft comprising the lift apparatus of any of clauses A1-A35.

Clause Set B

1. A lift apparatus of a vertical takeoff and landing (VTOL) craft, comprising:
    a lift propeller;
    a motor assembly coupled to the lift propeller, the motor assembly located within a enclosure;
    a heat exchanger located outside the enclosure, the heat exchanger being thermally coupled to the motor assembly by a coolant flow path;
    a boom;
    a fairing;
    an air inlet located at a top side of either the boom or the fairing, the air inlet configured to receive downwash of the lift propeller during a lift phase of the VTOL craft;
    a cooling path configured to direct the downwash to the heat exchanger; and
    an air outlet, the air outlet configured to exhaust the downwash from the heat exchanger.
2. The lift apparatus of clause B1, wherein a center of the air inlet is aligned with a longitudinal axis of the boom.
3. The lift apparatus of clause B1, wherein a center of the air inlet is offset from a longitudinal axis of the boom.
4. The lift apparatus of clause B3, wherein the air inlet is offset of the air inlet to a side of the longitudinal axis having the highest downwash pressure from the lift propeller.
5. The lift apparatus of clause B1, wherein the air inlet comprises a plurality of air inlets.
6. The lift apparatus of clause B5, wherein:
    the plurality of air inlets are located at different radial distances from a hub of the lift propeller;
    the plurality of air inlets are offset from each other in a direction perpendicular to a longitudinal axis of the boom; and
    for each of the plurality of air inlets, the offset in the direction perpendicular to the longitudinal axis of the boom corresponds to a side of the longitudinal axis, at the radial distance, having highest downwash pressure from the lift propeller.
7. The lift apparatus of clause B1, wherein in a cross-section of the boom, a width of the air inlet is more than 50% of a width of the boom.
8. The lift apparatus of clause B7, wherein in the cross-section of the boom, the width of the air inlet is more than 75% of the width of the boom.
9. The lift apparatus of clause B1, further comprising:
    a second lift propeller;
    a second motor assembly coupled to the second lift propeller, the second motor assembly located within a second enclosure;
    a second heat exchanger located outside the second enclosure, the second heat exchanger being thermally coupled to the motor assembly by a second coolant flow path;
    a second boom;
    a second fairing;
    a second air inlet located at a top side of the second boom or the second fairing, the second air inlet configured to receive second downwash of the second lift propeller during the lift phase of the VTOL craft;
    a second cooling path configured to direct the second downwash to the second heat exchanger; and
    a second air outlet, the second air outlet configured to exhaust the second downwash from the second heat exchanger.
10. The lift apparatus of clause B9, wherein:
    the motor assembly is configured to rotate the lift propeller in a first rotational direction;
    the second motor assembly is configured to rotate the second propeller in a second rotational direction opposite the first rotational direction;
    a center of the air inlet is offset from a longitudinal axis of the boom in a first offset direction; and
    a center of the second air inlet is offset from a longitudinal axis of the second boom in a second offset direction opposite the first offset direction.
11. The lift apparatus of clause B1, wherein the air outlet is located in the boom.
12. The lift apparatus of clause B1, wherein the air outlet is located in a bottom side of the fairing.
13. The lift apparatus of clause B12, wherein the air outlet is located under the heat exchanger.
14. The lift apparatus of clause B1, wherein the air outlet is located in the top side of the fairing.
15. The lift apparatus of clause B13, further comprising a second air outlet located in a bottom side of the fairing.
16. The lift apparatus of clause B13, wherein the air outlet surrounds a shaft of the lift propeller.
17. The lift apparatus of clause B16, wherein the air outlet comprises an elliptical shape.
18. The lift apparatus of clause B14, wherein the air outlet is located under a hub of the lift propeller.
19. The lift apparatus of clause B18, wherein a segment of an outer boundary of the air outlet is located under a hub of the lift propeller.

20. The lift apparatus of clause B1, further comprising:
   a first downwash flow path directed to an upper portion of the motor assembly; and
   a second downwash flow path directed to a lower portion of the motor assembly.
21. The lift apparatus of clause B20, wherein
   the air inlet comprises a first air sub-inlet and a second air sub-inlet;
   the first air sub-inlet is configured to direct a first portion of the downwash to the first downwash flow path; and
   the second air sub-inlet is configured to direct a second portion of the downwash to the second downwash flow path.
22. The lift apparatus of clause B20, further comprising a baffle configured to bifurcate the downwash into the first downwash flow path and the second downwash flow path.
23. The lift apparatus of clause B1, wherein
   the motor assembly comprises a hybrid-cooled motor assembly having a first motor assembly portion and a second motor assembly portion;
   the first motor assembly portion is configured to be directly air-cooled by a first portion of the downwash in a first downwash flow path;
   the second motor assembly portion is configured to be indirectly air-cooled via a fluid heat exchange medium in a second portion of the downwash in a second downwash flow path.
24. The lift apparatus of clause B1, further comprising a manifold configured to distribute the downwash around the motor assembly.
25. The lift apparatus of clause B1, further comprising a door configured to:
   open during the lift phase of the VTOL craft to expose the air inlet to the downwash, and
   close during a cruise phase of the VTOL craft to cover the air inlet.
26. The lift apparatus of clause B25, further comprising a control actuator configured to actuate the door.
27. The lift apparatus of clause B25, further comprising a biasing mechanism configured to bias the door to a closed position.
28. The lift apparatus of clause B27, wherein a biasing force of the biasing mechanism is configured to be higher than an opposing force from air during the cruise phase of the VTOL craft and lower than an opposing force from air during the lift phase of the VTOL craft.
29. The lift apparatus of clause B25, wherein the door is configured to be opened by a swirl component of the downwash.
30. The lift apparatus of clause B25, wherein the door comprises a hinge in the fairing.
31. The lift apparatus of clause B1, wherein the coolant flow path comprises a lubricating flow path, and the coolant is configured to lubricate a component of the motor assembly.
32. The lift apparatus of clause B1, wherein the motor assembly comprises a motor, a gearbox, and an inverter.
33. The lift apparatus of clause B32, wherein:
   the motor and gearbox share a same longitudinal axis; and
   an axis of the inverter is offset from the longitudinal axis of the motor and gearbox.
34. The lift apparatus of clause B32, wherein:
   the motor assembly comprises redundant components.
35. The lift apparatus of clause B34, wherein the redundant components comprise at least one of a redundant stator of the motor, and a redundant inverter stage of the inverter.
36. A vertical takeoff and landing (VTOL) craft comprising the lift apparatus of any of clauses B1-B35.

Clause Set C

1. A lift apparatus of a vertical takeoff and landing (VTOL) craft, comprising:
   a lift propeller;
   a motor assembly coupled to the lift propeller, the motor assembly located within a enclosure;
   a heat exchanger located outside the enclosure, the heat exchanger being thermally coupled to the motor assembly by a coolant flow path;
   a boom;
   a fairing;
   an air inlet located at a top side of either the boom or the fairing, the air inlet configured to receive downwash of the lift propeller during a lift phase of the VTOL craft;
   a first cooling path configured to direct a first portion of the downwash to cool a portion of the enclosure around the motor assembly;
   a second cooling path configured to direct a second portion of the downwash to cool the heat exchanger; and
   an air outlet, the air outlet configured to exhaust the downwash from the first cooling path or the second cooling path.
2. The lift apparatus of clause C1, wherein a center of the air inlet is aligned with a longitudinal axis of the boom.
3. The lift apparatus of clause C1, wherein a center of the air inlet is offset from a longitudinal axis of the boom.
4. The lift apparatus of clause C3, wherein the air inlet is offset of the air inlet to a side of the longitudinal axis having the highest downwash pressure from the lift propeller.
5. The lift apparatus of clause C1, wherein the air inlet comprises a plurality of air inlets.
6. The lift apparatus of clause C5, wherein:
   the plurality of air inlets are located at different radial distances from a hub of the lift propeller;
   the plurality of air inlets are offset from each other in a direction perpendicular to a longitudinal axis of the boom; and
   for each of the plurality of air inlets, the offset in the direction perpendicular to the longitudinal axis of the boom corresponds to a side of the longitudinal axis, at the radial distance, having highest downwash pressure from the lift propeller.
7. The lift apparatus of clause C1, wherein in a cross-section of the boom, a width of the air inlet is more than 50% of a width of the boom.
8. The lift apparatus of clause C7, wherein in the cross-section of the boom, the width of the air inlet is more than 75% of the width of the boom.
9. The lift apparatus of clause C1, further comprising:
   a second lift propeller;
   a second motor assembly coupled to the second lift propeller, the second motor assembly located within a second enclosure;
   a second heat exchanger located outside the second enclosure, the second heat exchanger being thermally coupled to the motor assembly by a second coolant flow path;
   a second boom;
   a second fairing;
   a second air inlet located at a top side of the second boom or the second fairing, the second air inlet configured to receive second downwash of the second lift propeller during the lift phase of the VTOL craft;

a third cooling path configured to direct a first portion of the second downwash to cool an exterior upper portion of the second motor assembly;

a fourth cooling path configured to direct a second portion of the second downwash to cool the heat exchanger; and and a second air outlet, the second air outlet configured to exhaust the second downwash from the third cooling path or the fourth cooling path.

10. The lift apparatus of clause C9, wherein:
the motor assembly is configured to rotate the lift propeller in a first rotational direction;
the second motor assembly is configured to rotate the second propeller in a second rotational direction opposite the first rotational direction;
a center of the air inlet is offset from a longitudinal axis of the boom in a first offset direction; and
a center of the second air inlet is offset from a longitudinal axis of the second boom in a second offset direction opposite the first offset direction.

11. The lift apparatus of clause C1, wherein the air outlet is located in the boom.

12. The lift apparatus of clause C1, wherein the air outlet is located in a bottom side of the fairing.

13. The lift apparatus of clause C12, wherein the air outlet is located under the heat exchanger.

14. The lift apparatus of clause C1, wherein the air outlet is located in the top side of the fairing.

15. The lift apparatus of clause C13, further comprising a second air outlet located in a bottom side of the fairing.

16. The lift apparatus of clause C13, wherein the air outlet surrounds a shaft of the lift propeller.

17. The lift apparatus of clause C16, wherein the air outlet comprises an elliptical shape.

18. The lift apparatus of clause C14, wherein the air outlet is located under a hub of the lift propeller.

19. The lift apparatus of clause C18, wherein a segment of an outer boundary of the air outlet is located under a hub of the lift propeller.

20. The lift apparatus of clause C1, wherein
the air inlet comprises a first air inlet and a second air inlet;
the first air inlet is configured to direct the first portion of the downwash to the first cooling path; and
the second air inlet is configured to direct the second portion of the downwash to the second cooling path.

21. The lift apparatus of clause C20, further comprising a baffle configured to bifurcate the downwash into the first cooling path and the second cooling path.

22. The lift apparatus of clause C1, further comprising a manifold configured to distribute the downwash around the motor assembly.

23. The lift apparatus of clause C1, further comprising a door configured to:
open during the lift phase of the VTOL craft to expose the air inlet to the downwash, and
close during a cruise phase of the VTOL craft to cover the air inlet.

24. The lift apparatus of clause C23, further comprising a control actuator configured to actuate the door.

25. The lift apparatus of clause C23, further comprising a biasing mechanism configured to bias the door to a closed position.

26. The lift apparatus of clause C25, wherein a biasing force of the biasing mechanism is configured to be higher than an opposing force from air during the cruise phase of the VTOL craft and lower than an opposing force from air during the lift phase of the VTOL craft.

27. The lift apparatus of clause C23, wherein the door is configured to be opened by a swirl component of the downwash.

28. The lift apparatus of clause C23, wherein the door comprises a hinge in the fairing.

29. The lift apparatus of clause C1, wherein the coolant flow path comprises a lubricating flow path, and the coolant is configured to lubricate a component of the motor assembly.

30. The lift apparatus of clause C1, wherein the motor assembly comprises a motor, a gearbox, and an inverter.

31. The lift apparatus of clause C30, wherein:
the motor and gearbox share a same longitudinal axis; and
an axis of the inverter is offset from the longitudinal axis of the motor and gearbox.

32. The lift apparatus of clause C30, wherein:
the motor assembly comprises redundant components.

33. The lift apparatus of clause C32, wherein the redundant components comprise at least one of a redundant stator of the motor, and a redundant inverter stage of the inverter.

34. A vertical takeoff and landing (VTOL) craft comprising the lift apparatus of any of clauses C1-C33.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The invention claimed is:

1. An apparatus for aircraft propulsion, comprising:
a propeller;
an electric engine mounted to a support structure and configured to rotate the propeller, the electric engine being located within an enclosure;
a first heat transfer element that is thermally coupled to the electric engine via a fluid flow path, wherein at least part of the first heat transfer element is located external to the enclosure;
a second heat transfer element that is integral to or thermally coupled to the electric engine for air cooling without a fluid intermediary;
the first heat transfer element and the second heat transfer element being located within the support structure;
at least one air inlet located at an upper side of the support structure, wherein the at least one air inlet is configured to receive downwash from the propeller;
a first enclosed cooling path configured to direct a first portion of the downwash from the at least one air inlet to the first heat transfer element;
a second enclosed cooling path configured to direct a second portion of the downwash from the at least one air inlet to the second heat transfer element; and
a first air outlet configured to exhaust the first portion of the downwash from the first heat transfer element.

2. The apparatus for aircraft propulsion of claim 1, wherein the first heat transfer element comprises a heat exchanger.

3. The apparatus for aircraft propulsion of claim 1, wherein:
the electric engine comprises a motor; and
the enclosure comprises a motor enclosure enclosing the motor,
wherein the fluid flow path is configured to circulate a fluid within the motor enclosure.

4. The apparatus for aircraft propulsion of claim 1, wherein the fluid flow path comprises one of an oil or a coolant.

5. The apparatus for aircraft propulsion of claim 2, wherein the second heat transfer element comprises air-cooling fins that are integral to or thermally coupled to the electric engine.

6. The apparatus for aircraft propulsion of claim 1, wherein the first air outlet is configured to exhaust the second portion of the downwash from the second heat transfer element.

7. The apparatus for aircraft propulsion of claim 1, further comprising:
a second air outlet, wherein the second air outlet is configured to exhaust the second portion of the downwash from the second heat transfer element.

8. The apparatus for aircraft propulsion of claim 7, wherein the second air outlet is located at an upper side of the support structure.

9. The apparatus for aircraft propulsion of claim 8, wherein the second air outlet is annular to or adjacent to a hub of the electric engine.

10. The apparatus for aircraft propulsion of claim 1, wherein the second enclosed cooling path is configured to direct the second portion of the downwash from the at least one air inlet, to the second heat transfer element, and then to the first heat transfer element.

11. The apparatus for aircraft propulsion of claim 1, wherein the first enclosed cooling path is configured to direct the first portion of the downwash from the at least one air inlet to the first heat transfer element and then to the second heat transfer element.

12. The apparatus for aircraft propulsion of claim 3, wherein:
the enclosure comprises an inverter enclosure enclosing an inverter and a dividing plate between an electric engine enclosure enclosing the electric engine and the inverter enclosure enclosing the inverter, wherein the dividing plate is configured to thermally couple the inverter to the fluid flow path.

13. The apparatus for aircraft propulsion of claim 3, wherein:
the enclosure comprises a gearbox enclosure enclosing a gearbox,
wherein the fluid flow path is configured to circulate fluid within the gearbox enclosure.

14. The apparatus for aircraft propulsion of claim 1, wherein the first portion of the downwash does not reach the second heat transfer element.

15. The apparatus for aircraft propulsion of claim 1, wherein the first enclosed cooling path and the second enclosed cooling path are configured to receive downwash from same air inlet.

16. An apparatus for aircraft propulsion, comprising:
a propeller;
an electric engine mounted to a support structure having a longitudinal axis through the center of the support structure, wherein the electric engine is configured to rotate a propeller, the electric engine being located within an enclosure;
a first heat transfer element that is thermally coupled to the electric engine, wherein at least part of the first heat transfer element is located external to the enclosure;
a first air inlet located at an upper side of the support structure, wherein the first air inlet is configured to receive downwash from the propeller during a lift phase, and wherein the first air inlet is radially offset from a hub of the electric engine and the first air inlet is laterally offset from the longitudinal axis, wherein an amount of the lateral offset positions the first air inlet in a region of high downwash pressure or airflow;
a first cooling path configured to direct a first portion of the downwash from the first air inlet to the first heat transfer element; and
a first air outlet configured to exhaust the first portion of the downwash from the first heat transfer element.

17. The apparatus for aircraft propulsion of claim 16, wherein the first heat transfer element comprises a heat exchanger.

18. The apparatus for aircraft propulsion of claim 17, further comprising:
a fluid flow path, wherein the heat exchanger is thermally coupled to the electric engine by the fluid flow path.

19. The apparatus for aircraft propulsion of claim 18, wherein the fluid flow path comprises one of an oil or a coolant.

20. The apparatus for aircraft propulsion of claim 18, wherein: the electric engine further comprises an inverter; and
the enclosure comprises an inverter enclosure enclosing the inverter and a dividing plate between an electric engine enclosure enclosing the electric engine and the inverter enclosure, wherein the dividing plate is configured to thermally couple the inverter to the fluid flow path.

21. The apparatus for aircraft propulsion of claim 18, wherein: the electric engine comprises a gearbox; and
the enclosure comprises a gearbox enclosure enclosing the gearbox,
wherein the fluid flow path is configured to circulate fluid within the gearbox enclosure.

22. The apparatus for aircraft propulsion of claim 16, further comprising:
a second heat transfer element that is thermally coupled to the electric engine, wherein at least part of the second heat transfer element is located external to the enclosure; and
a second cooling path configured to direct a second portion of the downwash from the first air inlet to the second heat transfer element.

23. The apparatus for aircraft propulsion of claim 22, further comprising:
a second air outlet, wherein the second air outlet is configured to exhaust the second portion of the downwash from the second heat transfer element.

24. The apparatus for aircraft propulsion of claim 23, wherein the second air outlet is located at an upper side of the support structure.

25. The apparatus for aircraft propulsion of claim 24, wherein the second air outlet is annular to or adjacent to a hub of the electric engine.

26. The apparatus for aircraft propulsion of claim 22, wherein the second heat transfer element comprises air-cooling fins integral to or thermally coupled to a part of the electric engine.

27. The apparatus for aircraft propulsion of claim 16, wherein the amount of lateral offset is based on a swirl component of the downwash.

28. The apparatus for aircraft propulsion of claim 16, further comprising a second air inlet configured to receive a second portion of the downwash and cool the electric engine, wherein the second air inlet is laterally offset from the longitudinal axis in a direction opposite from the lateral offset of the first air inlet, wherein an amount of the lateral offset of the second air inlet positions the second air inlet in a second region of high downwash pressure or airflow.

29. The apparatus for aircraft propulsion of claim 28, wherein a second cooling path is configured to direct the second portion of the downwash from the second air inlet to the first heat transfer element.

30. The apparatus for aircraft propulsion of claim 28, wherein the second air inlet is offset from the first air inlet in a longitudinal direction.

* * * * *